(12) United States Patent
Hankawa et al.

(10) Patent No.: US 7,453,650 B2
(45) Date of Patent: Nov. 18, 2008

(54) ZOOM OPTICAL SYSTEM AND ELECTRONIC IMAGING APPARATUS HAVING THE SAME

(75) Inventors: Masashi Hankawa, Hachioji (JP); Toru Miyajima, Hachioji (JP); Kouki Hozumi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/075,413

(22) Filed: Mar. 10, 2008

(65) Prior Publication Data

US 2008/0180808 A1 Jul. 31, 2008

Related U.S. Application Data

(63) Continuation of application No. 11/350,355, filed on Feb. 9, 2006, now abandoned.

(30) Foreign Application Priority Data

| Mar. 1, 2005 | (JP) | ............................... 2005-055797 |
| Mar. 31, 2005 | (JP) | ............................... 2005-103054 |
| Apr. 15, 2005 | (JP) | ............................... 2005-118378 |
| Jul. 7, 2005 | (JP) | ............................... 2005-198876 |

(51) Int. Cl.
*G02B 15/14* (2006.01)
*H04N 5/262* (2006.01)

(52) U.S. Cl. ............... 359/687; 348/240.99; 348/240.3; 359/686

(58) Field of Classification Search ................ 359/686, 359/687; 348/240.3, 240.99
See application file for complete search history.

(56) References Cited

U.S. PATENT DOCUMENTS

| 4,925,280 | A | 5/1990 | Hashimoto |
| 6,124,987 | A | 9/2000 | Kayanuma et al. |
| 6,308,011 | B1 | 10/2001 | Wachi et al. |
| 7,061,686 | B2 * | 6/2006 | Ohtake ........................ 359/687 |
| 2002/0063970 | A1 | 5/2002 | Uzawa et al. |
| 2003/0161620 | A1 | 8/2003 | Higimori et al. |
| 2003/0165020 | A1 | 9/2003 | Satori et al. |
| 2003/0206352 | A1 | 11/2003 | Mihara et al. |
| 2003/0231388 | A1 | 12/2003 | Hamano et al. |
| 2004/0201902 | A1 | 10/2004 | Mihara et al. |

FOREIGN PATENT DOCUMENTS

| JP | 03-182752 | 2/1993 |
| JP | 10-010013 | 7/1999 |
| JP | 2002-196804 | 2/2004 |

* cited by examiner

*Primary Examiner*—David N Spector
(74) *Attorney, Agent, or Firm*—Kenyon & Kenyon LLP

(57) ABSTRACT

An electronic imaging apparatus includes a zoom optical system having, in order from the object side, a first lens unit with positive power, a second lens unit with negative power, and an aperture stop, in which the first lens unit is composed of a single positive power unit and the second lens unit has a single negative lens element located at the most object-side position, both surfaces of which are concave, and a positive lens component located at the most image-side position; an electronic image sensor located on the image side of the zoom optical system; and an image processing section electrically processing image data obtained by the electronic image sensor to change the form thereof.

12 Claims, 23 Drawing Sheets

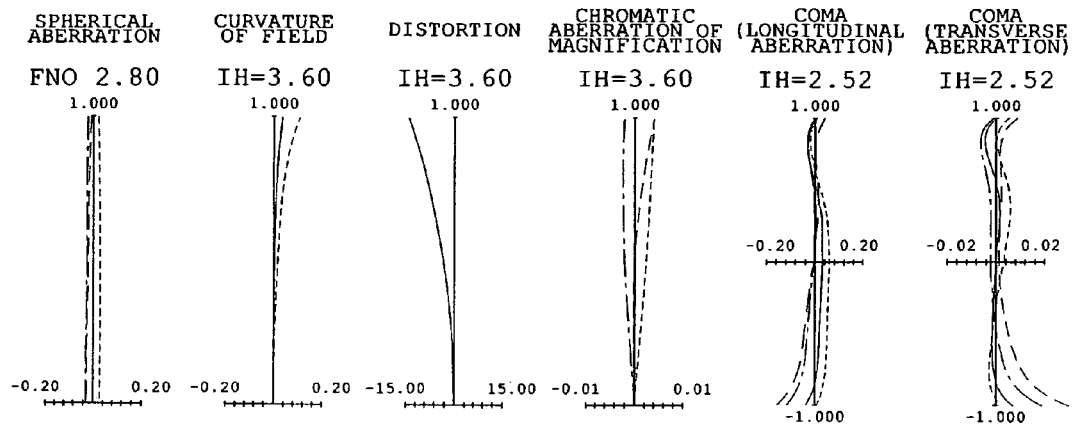
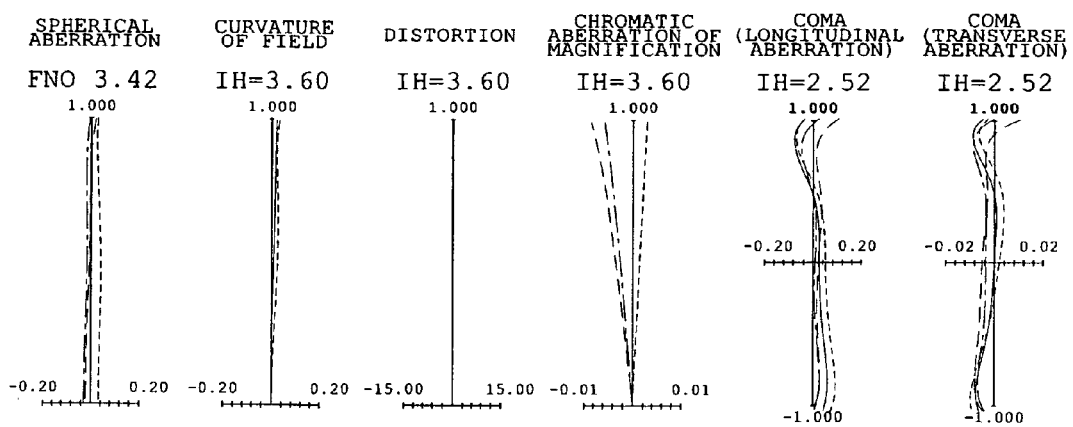
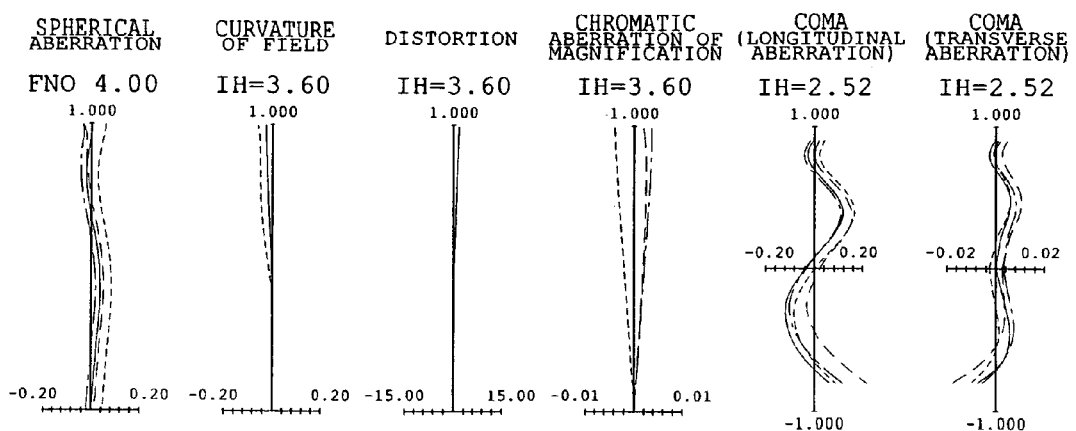

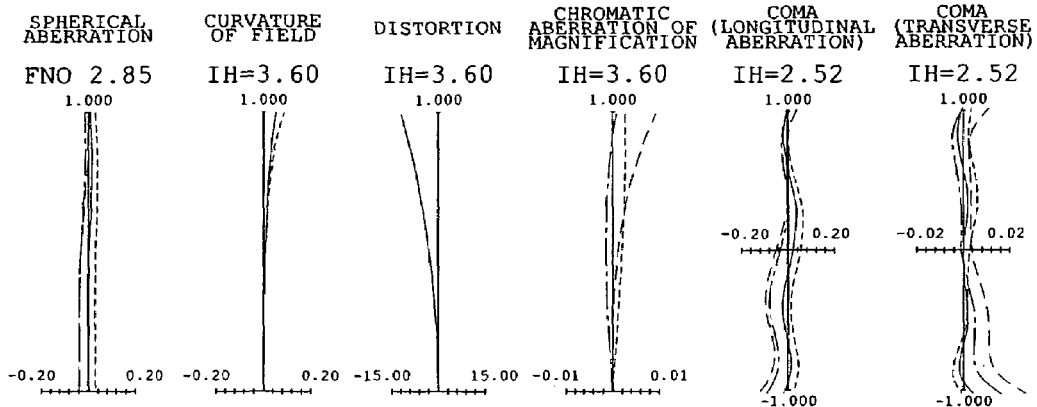
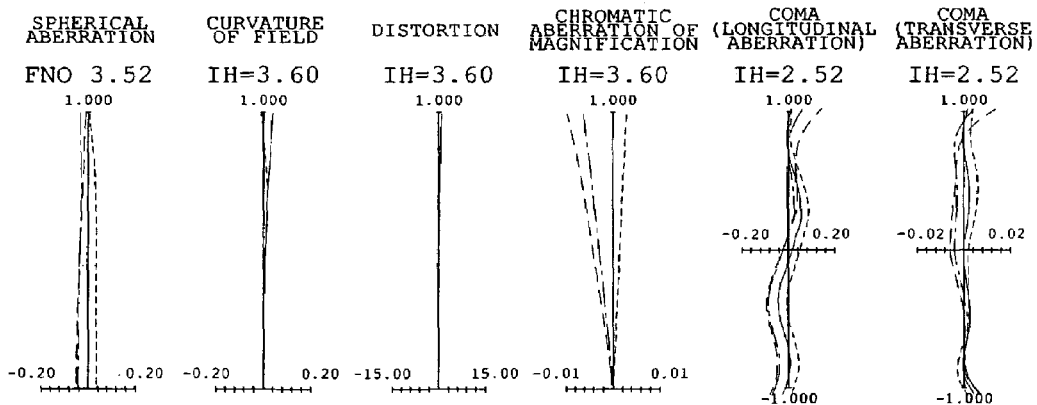
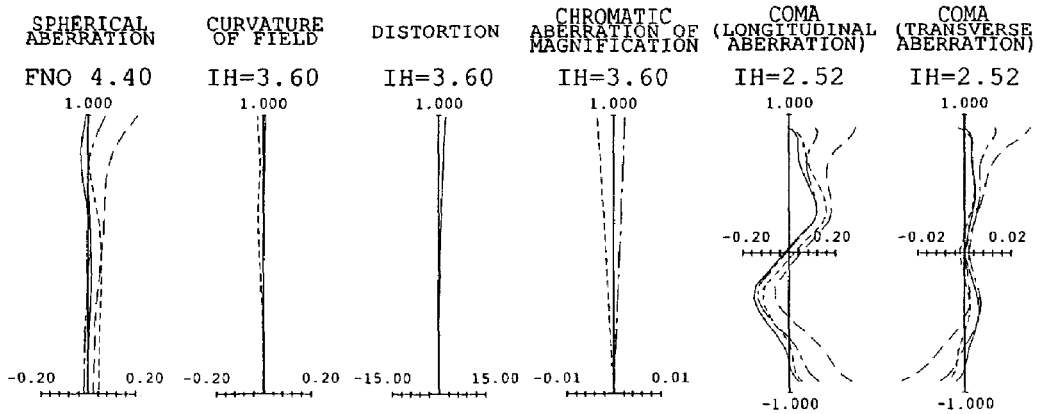

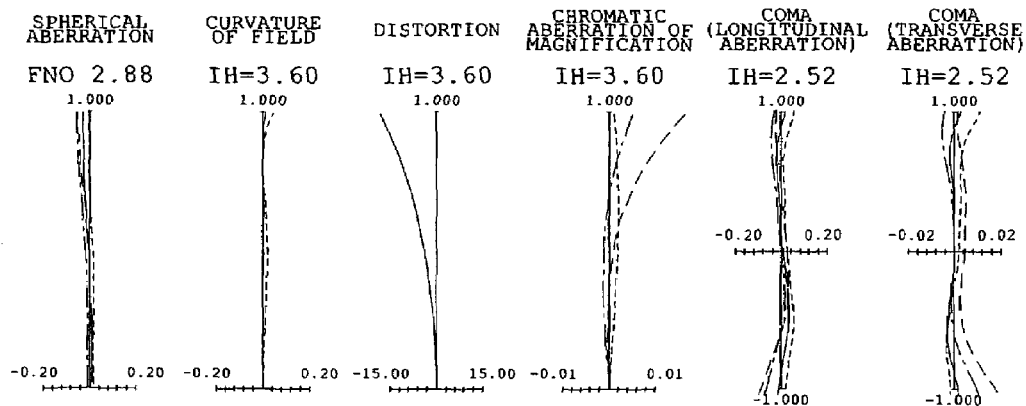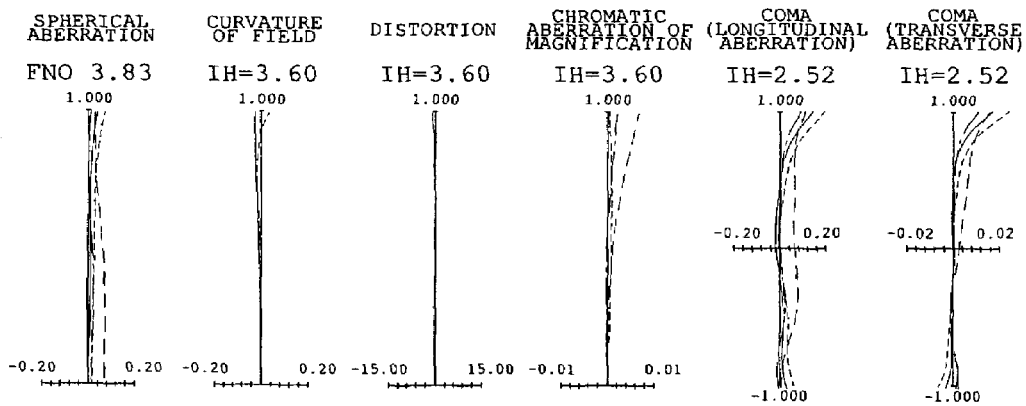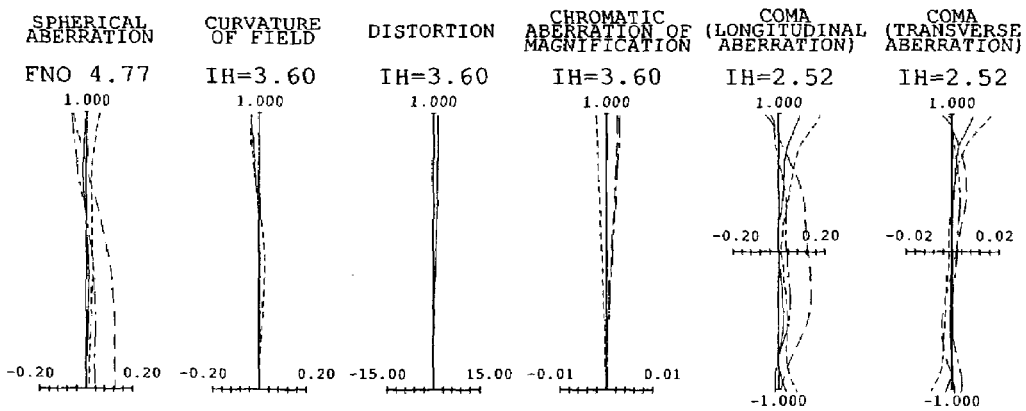

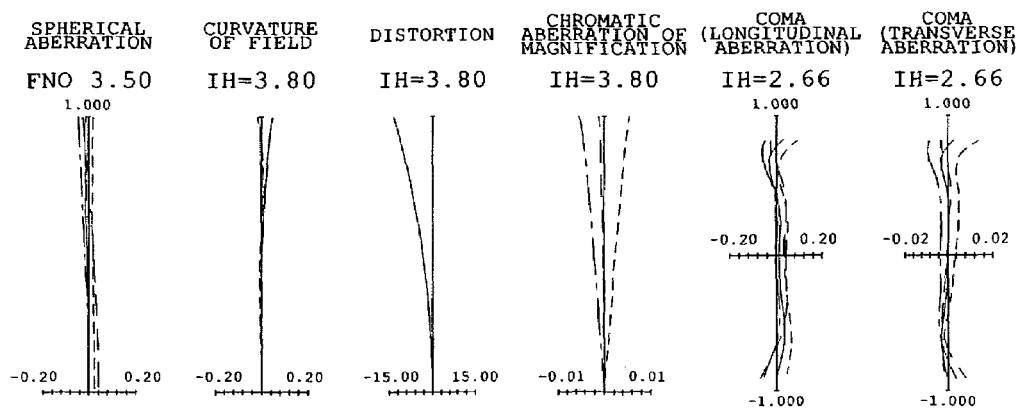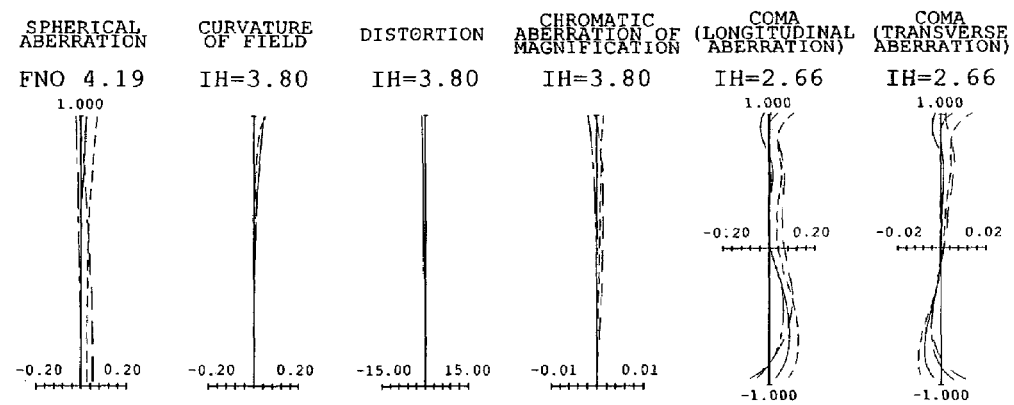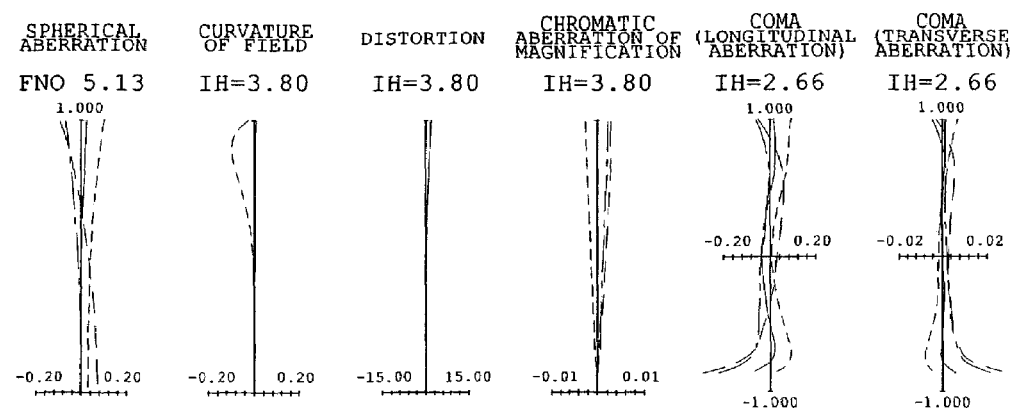

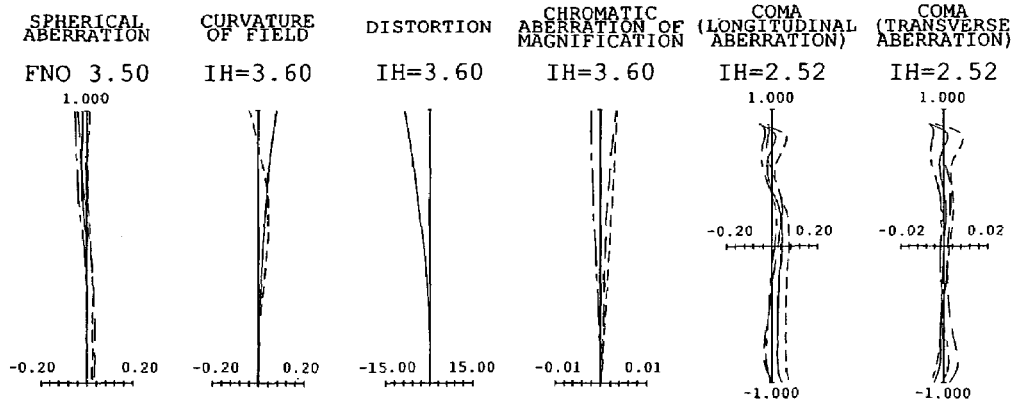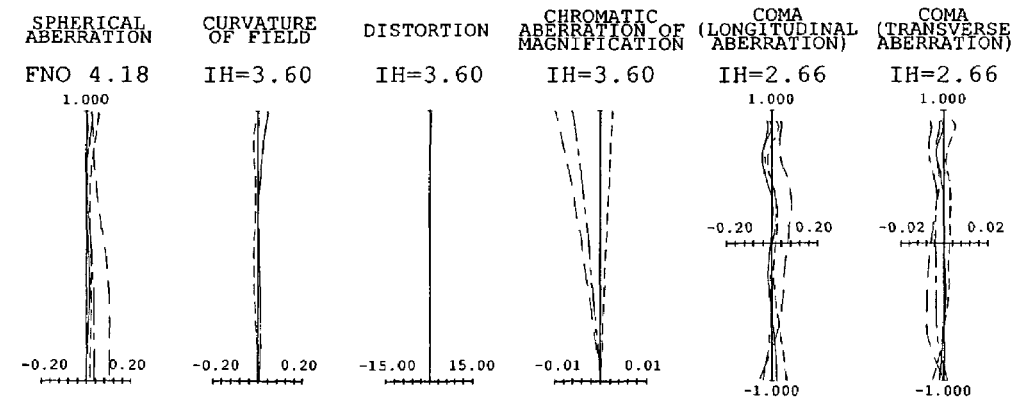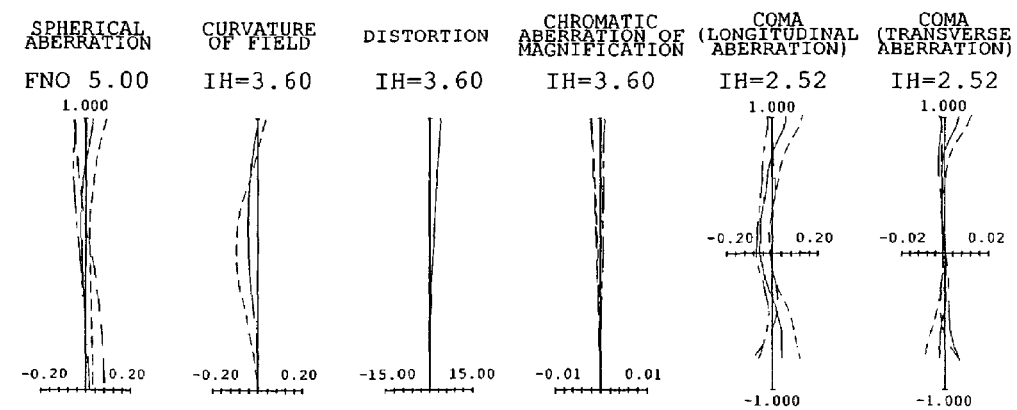

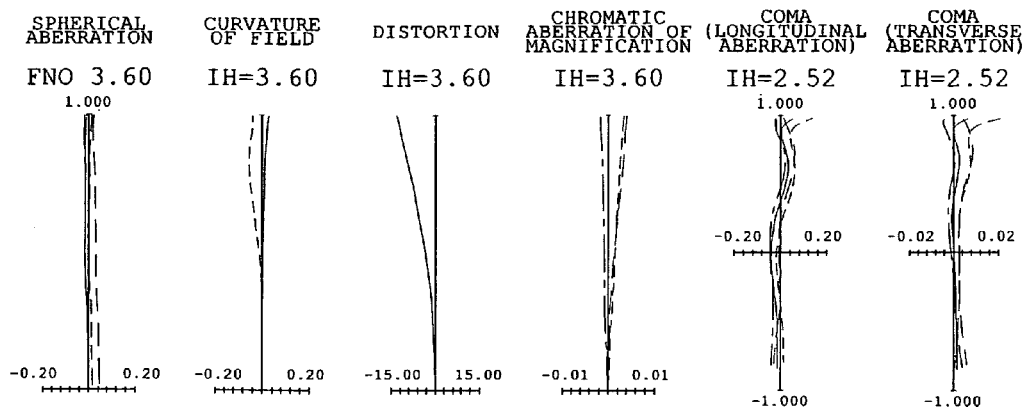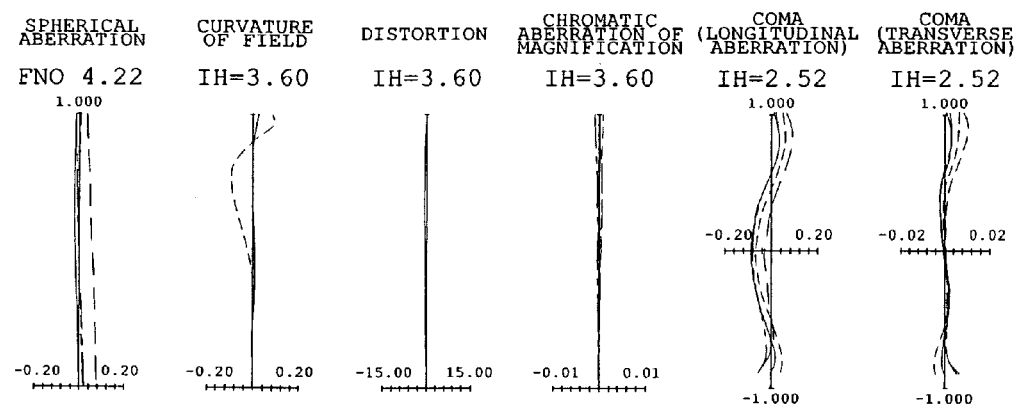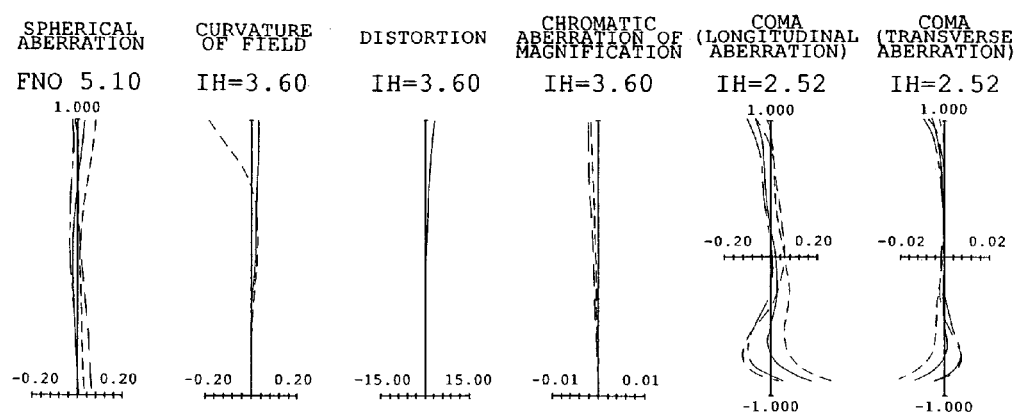

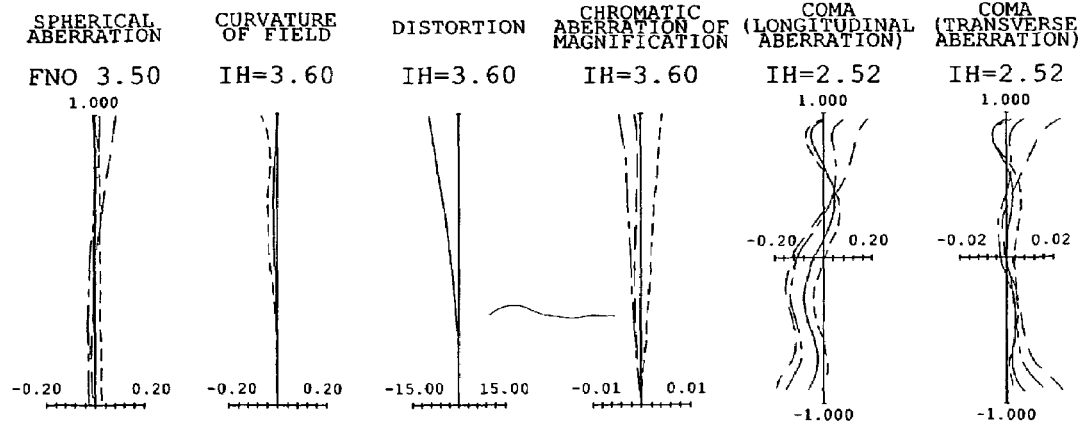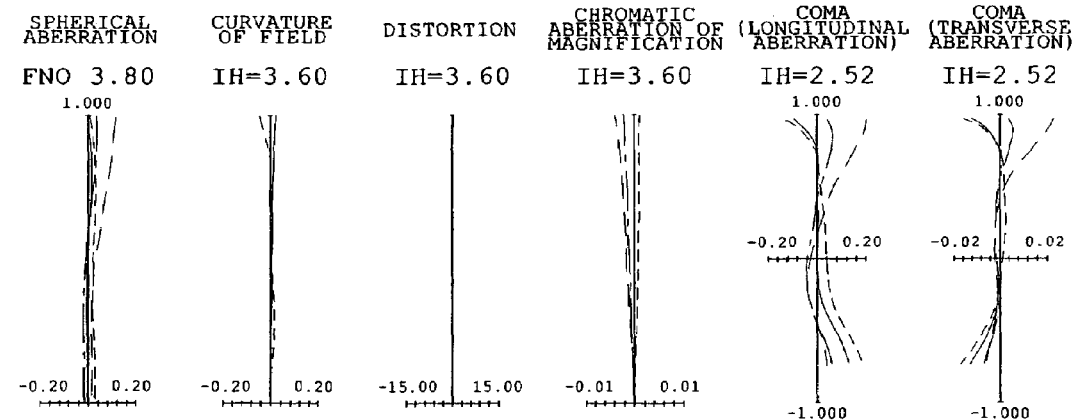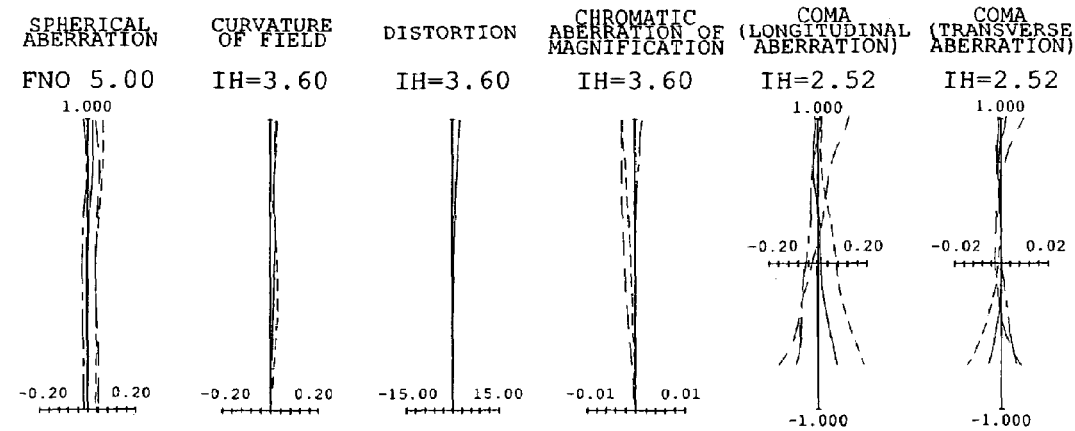

FIG.27A
FIG.27B
FIG.27C
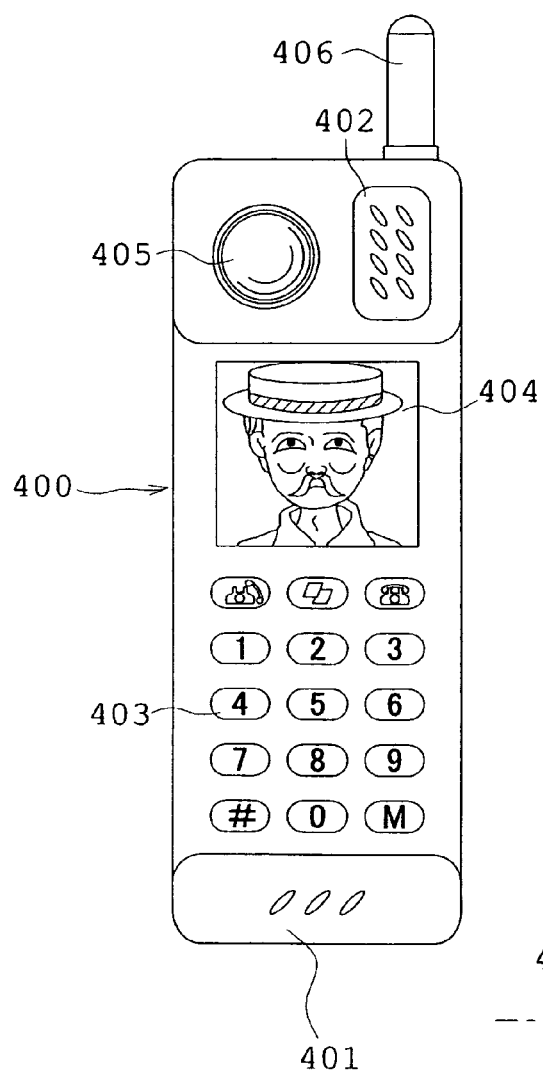
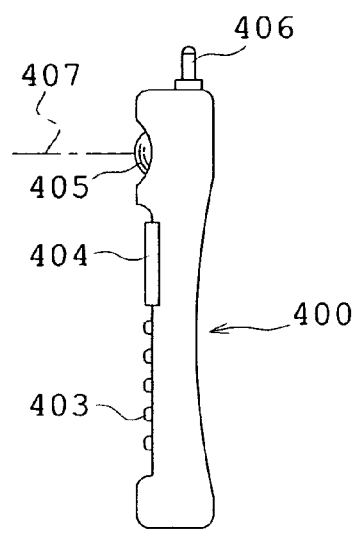
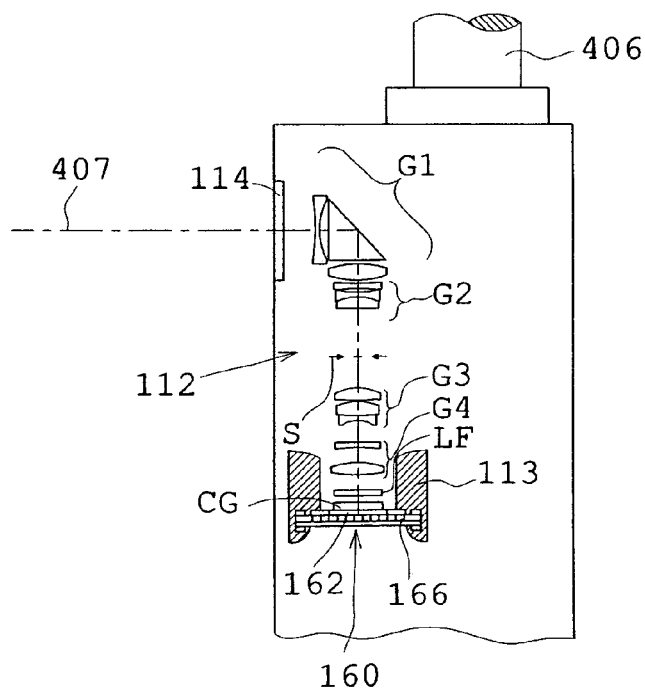

ZOOM OPTICAL SYSTEM AND ELECTRONIC IMAGING APPARATUS HAVING THE SAME

CROSS-REFERENCE TO RELATED APPLICATIONS

The present application is a continuation of U.S. patent application Ser. No. 11/350,355 now abandoned filed on Feb. 9, 2006, which in turn claimed priority benefits of Japanese Application No. 2005-055797 filed in Japan on Mar. 1, 2005; No. 2005-118378 filed in Japan on Apr. 15, 2005; No. 2005-103054 filed in Japan on Mar. 31, 2005; and No. 2005-198876 filed in Japan on Jul. 7, 2005, the contents of which are hereby incorporated by reference.

BACKGROUND OF THE INVENTION

1. Field of the Invention

This invention relates to a zoom lens and an electronic imaging apparatus using the zoom lens, and in particular, to an electronic imaging apparatus, including a video camera or a digital camera, in which a compact design and a slim design regarding a depth direction of a zoom optical system are attained.

2. Description of Related Art

Recently, special attention has been devoted to digital cameras (electronic cameras) as the next generation cameras that are an alternative to cameras for silver halide 35 mm films (135 formats). The digital cameras have come to have many categories in a wide range from a high-function type for business use to a popular portable type.

The greatest obstacle to a reduction in depth of a camera is the thickness of an optical system, notably extending from the most object-side surface of a zoom lens system to an imaging surface. The main current of a slim design technique for a camera body in recent years is to adopt a so-called collapsible lens barrel in which the optical system protrudes from the camera body in photography, but when the camera is carried, the optical system enters the camera body. To construct a zoom optical system of a high variable magnification ratio, it is known that an arrangement made to include, in order from the object side, a first lens unit with positive power, a second lens unit with negative power, and an aperture stop is effective. Such arrangements are disclosed, for example, in References 1-5 described below.

Reference 1: Japanese Patent Kokai No. Hei 1-201614
Reference 2: Japanese Patent Kokai No. Hei 5-27167
Reference 3: Japanese Patent Kokai No. 2002-62478
Reference 4: Japanese Patent Kokai No. 2003-255228
Reference 5: Japanese Patent Kokai No. 2003-295059

However, there are particular demands that a zoom ratio of at least 5 is required, a thickness corresponding to a depth is made smaller, the total length of the optical system and housing size are reduced, and in a collapsible type, compactness of the entire body should be attained by reducing the diameter of a front lens to make the lens barrel compact.

Generally, as an angle of view at a wide-angle position or the zoom ratio is increased, the diameter of the front lens relative to an image height becomes large and the total length of the zoom optical system in photography increases. In particular, when the angle of view at the wide-angle position is widened or the total length of the zoom optical system in photography at the wide-angle position is increased, the light-emitting position of a stroboscopic lamp must be separated from the optical axis of a photographic lens. This leads to oversizing of the body and the complication of the structure.

Recently, digital cameras in which an image of an object is photographed through a solid-state image sensor, such as a CCD (charge couples device) image sensor, to digitally process and record image data on a still image or movie image of the object have already been popularized.

Techniques relating to optical systems in which the collapsible lens barrel is adopted are proposed, for example, by References 6-8 listed below.

Reference 6: Japanese Patent Kokai No. Hei 11-194274
Reference 7: Japanese Patent Kokai No. Hei 11-287953
Reference 8: Japanese Patent Kokai No. 2000-9997

The optical system stated in each of References 6-8 includes, in order from the object side, a first lens unit with negative refracting power and a second lens unit with positive refracting power so that, upon zooming from the wide-angle position to the telephoto position, they are moved together.

In each optical system of References 6-8, however, the optical system of a zoom lens is linear and thus the shifting portion of the optical system is bulky. This causes the problem that when the collapsible lens barrel is adopted, time for rising into a state of use from a state where lenses are incorporated (that is, a shifting time of the optical system) is taken, which is unfavorable for practical use. Moreover, there is another problem that the movement of the most object-side lens unit in zooming is unfavorable for water- and dust-proof design.

To obtain a camera which has no time for rising into a state of use of the camera (the shifting time of the lenses), is favorable for water- and dust-proof design, and is very small in thickness in a depth direction, techniques relating to zoom optical systems in which the optical path (the optical axis) of the optical system can easily be bent by a reflecting optical element, such as a mirror, are proposed, for example, by References 9-12 described below.

Reference 9: Japanese Patent Kokai No. 2004-4533
Reference 10: Japanese Patent Kokai No. 2004-564343
Reference 11: Japanese Patent Kokai No. 2003-202500
Reference 12: Japanese Patent Kokai No. 2004-37967

The optical system set forth in each of References 9-12 adopts the structure that the optical path (the optical axis) of the optical system is bent by the reflecting optical element such as the mirror, thereby reducing a length in the direction of the incident optical axis of the zoom lens. Specifically, the optical path provided behind the reflecting optical element is bent in a longitudinal or lateral direction of the camera body, and thereby the dimension in the depth direction is decreased as far as possible.

However, in order to attain the compact design of the digital camera, a smaller-sized and higher-performance zoom lens is required.

SUMMARY OF THE INVENTION

The electronic imaging apparatus according to the present invention comprises a zoom optical system including, in order from the object side, a first lens unit with positive power, a second lens unit with negative power, and an aperture stop, in which the first lens unit is composed of a single positive power unit and the second lens unit has a single negative lens element located at the most object-side position, both surfaces of which are concave, and a positive lens component located at the most image-side position; an electronic image sensor located on the image side of the zoom optical system; and an image processing section electrically processing image data obtained by the electronic image sensor to change the form thereof.

In the present invention, the "positive power unit" refers to a single positive lens element or a cemented lens component (a set of lens elements cemented to each other) having positive refracting power as a whole.

In the electronic imaging apparatus according to the present invention, the zoom optical system preferably satisfies the following conditions in focusing of a nearly infinite object point:

$$0.85 < |y_{07}/(fw \cdot \tan \omega_{07w})| < 0.95 \quad (1)$$

$$0.75 < |y_{10}/(fw \cdot \tan \omega_{10w})| < 0.90 \quad (2)$$

where $y_{10}$ is the maximum image height; $y_{07}$ is an image height expressed by multiplying the maximum image height by 0.7; fw is the focal length of the entire zoom optical system at the wide-angle position; $\omega_{07w}$ is an angle of a ray of light incident on a first surface of a lens unit, corresponding to an image point of the image height $y_{07}$ at the wide-angle position, to the optical axis; and $\omega_{10w}$ is an angle of a ray of light incident on the first surface of the lens unit, corresponding to an image point of the image height $y_{10}$ at the wide-angle position, to the optical axis.

In the electronic imaging apparatus according to the present invention, the zoom optical system preferably satisfies the following condition in focusing of a nearly infinite object point:

$$0.05 < |y_{07}/(fw \cdot \tan \omega_{07w}) - y_{10}/(fw \cdot \tan \omega_{10w})| < 0.15 \quad (3)$$

In the electronic imaging apparatus according to the present invention, the zoom optical system preferably satisfies the following condition in focusing of a nearly infinite object point:

$$0.5 < (R21 + R22)/(R21 - R22) < 0.95 \quad (4)$$

where R21 is the radius of curvature of the object-side surface of the single negative lens element in the second lens unit and R22 is the radius of curvature of the image-side surface of the single negative lens element in the second lens unit.

In the electronic imaging apparatus according to the present invention, the zoom optical system preferably satisfies the following condition in focusing of a nearly infinite object point:

$$n_{dA2} > 1.70 \quad (5)$$

where $n_{dA2}$ is a refractive index, relating to the d line (587.56 nm), of the single negative lens element in the second lens unit.

The electronic imaging apparatus according to the present invention preferably satisfies the following condition:

$$ft/fw > 4 \quad (6)$$

where ft is the focal length of the entire zoom optical system at a telephoto position.

The electronic imaging apparatus according to the present invention preferably satisfies the following condition:

$$0.90 < (R23 + R24)/(R23 - R24) < -0.20 \quad (7)$$

where R23 is the radius of curvature of the most object-side surface of the positive lens component in the second lens unit and R24 is the radius of curvature of the most image-side surface of the positive lens component in the second lens unit.

The electronic imaging apparatus according to the present invention preferably satisfies the following condition:

$$0.6 < (\beta 2t/\beta 2w)/(\beta 3t/\beta 3w) < 1.2 \quad (8)$$

where $\beta 2t$ is the magnification of the second lens unit at the telephoto position, $\beta 2w$ is the magnification of the second lens unit at the wide-angle position, $\beta 3t$ is the magnification of a third lens unit at the telephoto position, and $\beta 3w$ is the magnification of the third lens unit at the wide-angle position.

In the electronic imaging apparatus according to the present invention, the second lens unit preferably includes, in order from the object side, the single negative lens element whose both surfaces are concave, a single negative lens element, and the positive lens component.

The electronic imaging apparatus according to the present invention preferably satisfies the following condition:

$$0.2 < (LT - LW)/(DT - DW) < 1.1 \quad (9)$$

where LT is the total length of the zoom optical system at the telephoto position, LW is the total length of the zoom optical system at the wide-angle position, DT is a spacing between the first lens unit and the second lens unit at the telephoto position, and DW is a spacing between the first lens unit and the second lens unit at the wide-angle position.

In the electronic imaging apparatus according to present invention, the zoom optical system preferably includes, in order from the object side, the first lens unit with positive power, the second lens unit with negative power, the aperture stop, a third lens unit with positive power, and a fourth lens unit with positive power. Upon zooming from a wide-angle region to a telephoto region, at least, a spacing between the first lens unit and the second lens unit is widened, a spacing between the second lens unit and the third lens unit is narrowed, and a spacing between the third lens unit and the fourth lens unit is widened.

In the electronic imaging apparatus according to the present invention, the second lens unit and the third lens unit have a positive lens component and a negative lens component, respectively. Here, a lens component is such that only the most object-side surface and the most image-side surface of this lens come in contact with air and have is no air spacing between them, and single lens element or a cemented lens component is taken as one unit.

In the electronic imaging apparatus according to the present invention, the zoom optical system preferably includes, in order from the object side, the first lens unit with positive power, the second lens unit with negative power, the aperture stop, the third lens unit with positive power, and the fourth lens unit with positive power. Upon zooming from the wide-angle region to the telephoto region, a spacing between the first lens unit and the second lens unit is widened, a spacing between the second lens unit and the third lens unit is narrowed, a spacing between the third lens unit and the fourth lens unit is widened, a spacing between the fourth lens unit and an electronic image sensor is changed, and the stop is moved integrally with the third lens unit.

In the electronic imaging apparatus according to the present invention, the fourth lens unit is preferably a single positive lens element.

The electronic imaging apparatus of the present invention comprises a zoom optical system including, in order from the object side, a first lens unit with positive refracting power and a second lens unit with negative refracting power; an electronic image sensor located on the image side of the zoom optical system; and an image processing section electronically processing image data obtained by the electronic image sensor to change the form thereof. The first lens unit has, in order from the object side, a single negative lens element whose both surfaces are concave, a reflecting member, and a single positive lens component.

In the electronic imaging apparatus of the present invention, the zoom optical system preferably satisfies the following conditions in focusing of a nearly infinite object point:

$$0.85 < |y_{07}/(fw \cdot \tan \omega_{07w})| < 0.97 \quad (10)$$

$$0.75 < |y_{10}/(fw \cdot \tan \omega_{10w})| < 0.92 \quad (11)$$

where $y_{10}$ is the maximum image height; $y_{07}$ is an image height expressed by multiplying the maximum image height by 0.7; fw is the focal length of the entire zoom optical system at the wide-angle position; $\omega_{07w}$ is an angle of a ray of light incident on a first surface of a lens unit, corresponding to an image point of the image height $y_{07}$ at the wide-angle position, to the optical axis; and $\omega_{10w}$ is an angle of a ray of light incident on the first surface of the lens unit, corresponding to an image point of the image height $y_{10}$ at the wide-angle position, to the optical axis.

In the electronic imaging apparatus of the present invention, the zoom optical system preferably satisfies the following condition in focusing of a nearly infinite object point:

$$0.02 < |y_{07}/(fw \cdot \tan \omega_{07w}) - y_{10})/(fw \cdot \tan \omega_{10w})| < 0.15 \quad (12)$$

The zoom optical system of the present invention includes, in order from the object side, a first lens unit with positive refracting power and a second lens unit with negative refracting power. In this case, the first lens unit has, in order from the object side, a single negative lens element whose both surfaces are concave, a reflecting member, and a single positive lens element.

In the zoom optical system of the present invention, the single positive lens element in the first lens unit is preferably a single biconvex positive lens element.

The electronic imaging apparatus of the present invention comprises the zoom optical system, an electronic image sensor located on the image side of the zoom optical system, and an image processing section electrically processing image data obtained by the electronic image sensor to change the form thereof.

In the present invention, the zoom optical system preferably satisfies the following condition in focusing of a nearly infinite object point:

$$0.33 < (R11 + R12)/(R11 - R12) < 0.82 \quad (13)$$

where R11 is the radius of curvature, measured along the optical axis, of the object-side surface of the single negative lens element and R12 is the radius of curvature, measured along the optical axis, of the image-side surface of the single negative lens element.

In the present invention, the zoom optical system preferably satisfies the following condition in focusing of a nearly infinite object point:

$$n_{d41} > 1.70 \quad (14)$$

where $n_{d41}$ is a refractive index, relating to the d line (587.56 nm), of the single negative lens element.

In the present invention, the electronic imaging apparatus preferably satisfies the following condition:

$$-3 < f_1/fw < -0.5 \quad (15)$$

where $f_1$ is the focal length of the first lens unit and fw is the focal length of the entire zoom optical system at the wide-angle position.

In the present invention, the zoom optical system preferably includes, in order from the object side, the first lens unit with positive refracting power, the second lens unit with negative refracting power, a third lens unit with positive refracting power, and a fourth lens unit with positive refracting power. Upon zooming from the wide-angle position to the telephoto position, the first lens unit is fixed with respect to the image plane, the second lens unit is moved toward the image side, the third lens unit is fixed, and the fourth lens unit is moved toward the object side.

These and other feature and advantages for the present invention will become apparent from the following detailed description of the preferred embodiments when taken in conjunction with the accompanying drawings.

BRIEF DESCRIPTION OF THE DRAWINGS

FIGS. 4A, 4B, 4C, 4D, 4E, and 4F are diagrams showing aberration characteristics at the wide-angle position of the zoom optical system of the first embodiment;

FIGS. 4Q 4H, 4I, 4J, 4K, and 4L are diagrams showing aberration characteristics at the middle position of the zoom optical system of the first embodiment;

FIGS. 4M 4N, 4O, 4P, 4Q, and 4R are diagrams showing aberration characteristics at the telephoto position of the zoom optical system of the first embodiment;

FIGS. 6A, 6B, 6C, 6D, 6E, and 6F are diagrams showing aberration characteristics at the wide-angle position of the zoom optical system of the second embodiment;

FIGS. 6Q 6H, 6I, 6J, 6K, and 6L are diagrams showing aberration characteristics at the middle position of the zoom optical system of the second embodiment;

FIGS. 6M 6N, 6O, 6P, 6Q, and 6R are diagrams showing aberration characteristics at the telephoto position of the zoom optical system of the second embodiment;

FIGS. 8A, 8B, 8C, 8D, 8E, and 8F are diagrams showing aberration characteristics at the wide-angle position of the zoom optical system of the third embodiment;

FIGS. 8G, 8H, 8I, 8J, 8K, and 8L are diagrams showing aberration characteristics at the middle position of the zoom optical system of the third embodiment;

FIGS. 8M 8N, 8O, 8P, 8Q, and 8R are diagrams showing aberration characteristics at the telephoto position of the zoom optical system of the third embodiment;

FIGS. 10A, 10B, 10C, 10D, 10E, and 10F are diagrams showing aberration characteristics at the wide-angle position of the zoom optical system of the fourth embodiment;

FIGS. 10G, 10H, 10I, 10J, 10K, and 10L are diagrams showing aberration characteristics at the middle position of the zoom optical system of the fourth embodiment;

FIGS. 10M, 10N, 10O, 10P, 10Q, and 10R are diagrams showing aberration characteristics at the telephoto position of the zoom optical system of the fourth embodiment;

FIGS. 12A, 12B, 12C, 12D, 12E, and 12F are diagrams showing aberration characteristics at the wide-angle position of the zoom optical system of the fifth embodiment;

FIGS. 12G, 12H, 12I, 12J, 12K, and 12L are diagrams showing aberration characteristics at the middle position of the zoom optical system of the fifth embodiment;

FIGS. 12M, 12N, 12O, 12P, 12Q, and 12R are diagrams showing aberration characteristics at the telephoto position of the zoom optical system of the fifth embodiment;

FIGS. 14A, 14B, 14C, 14D, 14E, and 14F are diagrams showing aberration characteristics at the wide-angle position of the zoom optical system of the sixth embodiment;

FIGS. 14G, 14H, 14I, 14J, 14K, and 14L are diagrams showing aberration characteristics at the middle position of the zoom optical system of the sixth embodiment;

FIGS. 14M, 14N, 14O, 14P, 14Q, and 14R are diagrams showing aberration characteristics at the telephoto position of the zoom optical system of the sixth embodiment;

FIGS. 16A, 16B, 16C, 16D, 16E, and 16F are diagrams showing aberration characteristics at the wide-angle position of the zoom optical system of the seventh embodiment;

FIGS. 16G, 16H, 16I, 16J, 16K, and 16L are diagrams showing aberration characteristics at the middle position of the zoom optical system of the seventh embodiment;

FIGS. 16M, 16N, 16O, 16P, 16Q, and 16R are diagrams showing aberration characteristics at the telephoto position of the zoom optical system of the seventh embodiment;

FIG. 27A is a front view showing an example of a mobile phone incorporating the zoom optical system according to the present invention;

FIG. 27B is a side view showing the mobile phone of FIG. 27A; and

FIG. 27C is a sectional view showing a photographing optical system incorporated in the mobile phone of FIG. 27A.

DETAILED DESCRIPTION OF THE PREFERRED EMBODIMENTS

Figure 1:
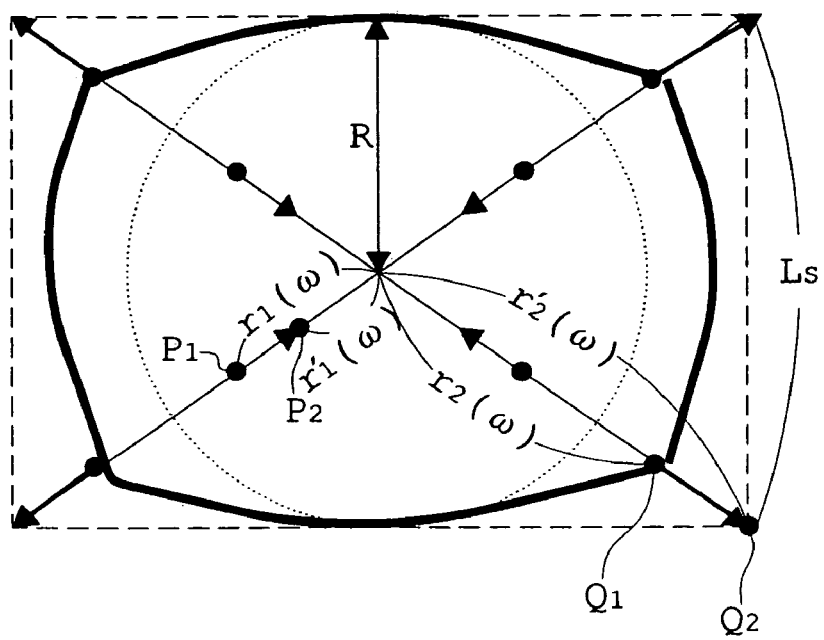
FIG. 1 is an explanatory view showing a fundamental conception for digitally correcting image distortion.

Before undertaking the description of the embodiments, the function and effect of the present invention will be explained.

Generally, in an arrangement made to include, in order from the object side, the first lens unit with positive power, the second lens unit with negative power, and the aperture stop, the outside diameter of the first lens unit becomes largest. Thus, when an air spacing is provided between lens elements in the first lens unit, a large space is required in the direction of thickness and the thickness of the whole of the first lens unit cannot be decreased. By placing a positive cemented lens component with no air spacing between the lens elements or a single positive lens element, the outside diameter and the total length of the first lens unit can be reduced. With this arrangement, however, it becomes difficult to favorably correct distortion and both astigmatism and coma. In order to overcome this problem, formerly the optical system has been designed so that the power is moderated to extend the total length or the angle of view is narrowed at the wide-angle position, and thereby the influence of off-axis aberrations (distortion, astigmatism, and coma) is lessened.

The electronic imaging apparatus according to the present invention comprises a zoom optical system including, in order from the object side, a first lens unit with positive power, a second lens unit with negative power, and an aperture stop, in which the first lens unit is composed of a single positive power unit and the second lens unit has a single negative lens element located at the most object-side position, both surfaces of which are concave, and a positive lens component located at the most image-side position; an electronic image sensor located on the image side of the zoom optical system; and an image processing section electrically processing image data obtained by the electronic image sensor to change the form thereof.

According to the present invention, in the second lens unit, the single negative lens element whose both surfaces are concave is located at the most object-side position and the positive lens component is located at the most image-side position so that correction for astigmatism and coma is facilitated in cooperation with the first lens unit. Distortion for which correction becomes difficult here is corrected at an image processing step and thereby the quality of the entire image is improved. (At the image processing step, correction for distortion, in contrast with correction for coma, can be made without imposing a load on a system.)

In the electronic imaging apparatus according to the present invention, the zoom optical system preferably satisfies Conditions (1) and (2) in focusing of a nearly infinite object point.

If the lower limit of each of Conditions (1) and (2) is exceeded, an image will show considerable distortion and, in correction by electric image processing, the degradation of resolution of the image on an image periphery will be increased. Beyond the upper limit, the diameters and thicknesses of the first and second lens units are increased.

In this case, it is desirable to satisfy the following conditions:

$$0.85 < |y_{07}/(fw \cdot \tan \omega_{07w})| < 0.95 \quad (1')$$

$$0.75 < |y_{10}/(fw \cdot \tan \omega_{10w})| < 0.88 \quad (2')$$

In the electronic imaging apparatus according to the present invention, the zoom optical system preferably satisfies Condition (3) in focusing of a nearly infinite object point.

By satisfying Condition (3), it is possible to keep the influence of the degradation of image quality by electric image processing to a minimum and to hold a good balance between the degradation of image quality and the compact design of the optical system.

Below the lower limit of Condition (3), sizes of the diameter and thickness of each lens unit are increased, while beyond the upper limit, the degradation of image quality on the image periphery becomes pronounced due to electric image processing.

In this case, it is desirable to satisfy the following condition:

$$0.06 < |y_{07}/(fw \cdot \tan \omega_{07w}) - y_{10}/(fw \cdot \tan \omega_{10w})| < 0.12 \quad (3')$$

In the electronic imaging apparatus according to the present invention, the zoom optical system preferably satisfies Condition (4) in focusing of a nearly infinite object point.

Condition (4) expresses the shape of the single negative lens element. Below the lower limit of Condition (4), the sag amount of R21 (the radius of curvature of the object-side surface of the single negative lens element in the second lens unit) is increased and the lens thickness becomes large, or the power of R22 (the radius of curvature of the image-side surface of the single negative lens element in the second lens unit) is lessened and it becomes difficult to ensure a satisfactory angle of view. Beyond the upper limit, the sag amount of the radius of curvature R22 is increased and the thickness of the second lens unit becomes large, or the power of the radius of curvature R2 is lessened and it becomes difficult to ensure a satisfactory angle of view.

In this case, it is desirable to satisfy the following condition:

$$0.7 < (R21 + R22)/(R21 - R22) < 0.90 \quad (4')$$

In the electronic imaging apparatus according to the present invention, the zoom optical system preferably satisfies Condition (5) in focusing of a nearly infinite object point.

Condition (5) determines the refractive index of the single negative lens element. By satisfying Condition (5), the sag amounts of the radii of curvature R21 and R22 can be made smaller, which is favorable for the compact design. In particular, it also has effects on correction for coma and downsizing of the front lens diameter.

The electronic imaging apparatus according to the present invention preferably satisfies Condition (6).

Condition (6) expresses a zoom magnification. Below the lower limit of Condition (6), the effect of the present invention of reducing sizes of the outside diameter and thickness of the first lens unit is impaired. Conversely, since the arrangement of the first lens unit is complicated in order to correct the fluctuation of distortion and the compact design becomes difficult as the magnification becomes high, it is said that the effect of the present invention is high.

The electronic imaging apparatus according to the present invention preferably satisfies Condition (7).

Condition (7) expresses the shape of the positive lens component. Below the lower limit of Condition (7), it becomes hard to further decrease the thickness in order to ensure the refracting power of the positive lens component. Beyond the upper limit, refraction by the surface of the radius of curvature R24 becomes so strong that it becomes difficult to favorably correct spherical aberration and coma.

The electronic imaging apparatus according to the present invention preferably satisfies Condition (8).

Condition (8) shows the ratio of a variable magnification function between the second lens unit and the third lens unit to determine the extent of their share of the variable magnification function ranging from the wide-angle position to the telephoto position. In view of the compact design, including a lens frame, it is convenient for the optimization of a cam shape to share a main variable magnification function between the second lens unit and the third lens unit.

Below the lower limit of Condition (8), a load imposed upon the third lens unit becomes heavy and the amount of movement of the third lens unit in zooming is increased, which is unfavorable for the compact design. Beyond the upper limit, a load imposed upon the second lens unit becomes heavy and the amount of movement of the second lens unit in zooming is increased, which is unfavorable for the compact design.

In the electronic imaging apparatus according to the present invention, the second lens unit preferably includes, in order from the object side, a single negative lens element whose both surfaces are concave, a single negative lens element, and a positive lens component.

In this arrangement, in order to keep the thickness of the entire second lens unit to a minimum and favorably correct spherical aberration and coma while keeping the sag amount of the single negative lens element to a minimum and having a configuration advantageous for cost, it is desirable to interpose a negative lens element between the single negative lens element and the positive lens component.

The electronic imaging apparatus according to the present invention preferably satisfies Condition (9).

Below the lower limit of Condition (9), the total length of the optical system at the wide-angle position is increased or the variable magnification ratio is reduced. Beyond the upper limit, a load imposed upon a lens frame structure becomes heavy and the lens frame structure is complicated or the length of the collapsible lens barrel must be increased, which is unfavorable.

In the electronic imaging apparatus according to the present invention, the zoom optical system preferably includes, in order from the object side, a first lens unit with positive power, a second lens unit with negative power, a third lens unit with positive power, and a fourth lens unit with positive power. Upon zooming from the wide-angle region to the telephoto region, at least, a spacing between the first lens unit and the second lens unit is widened, a spacing between the second lens unit and the third lens unit is narrowed, and a spacing between the third lens unit and the fourth lens unit is widened. In addition, it is desirable that an aperture stop is interposed between the second lens unit and the third lens unit.

According to this arrangement, off-axis aberration can be favorably corrected, and there is the advantage of being able to obtain the zoom lens with a high variable magnification ratio which is higher in performance, including axial aberration and the exit pupil.

In such an arrangement, the zoom optical system may be designed so that, upon zooming from the wide-angle region to the telephoto region, the first lens unit is moved toward the object side, the second lens unit is moved toward the image side along a locus that is convex toward the image side, the third lens unit is moved toward the object side, and the fourth lens unit is moved toward the image side along a locus that is convex toward the object side.

Alternatively, the zoom optical system may be designed so that the first lens unit is moved toward the object side, the second lens unit is moved toward the image side, the third lens unit is moved toward the object side, and the fourth lens unit is moved toward the image side along a locus that is convex toward the image side.

In this way, upon zooming from the wide-angle position to the telephoto position, all the lens units may be moved.

In the electronic imaging apparatus according to the present invention, the second lens unit and the third lens unit have a positive lens component and a negative lens component, respectively. Here, a lens component is such that only the most object-side surface and the most image-side surface of this lens come in contact with air and have no air spacing between them, and single lens element or a cemented lens component is taken as one unit.

By this arrangement, off-axis aberration can be favorably corrected, and there is the advantage of being able to obtain the zoom lens with a high variable magnification ratio in which chromatic aberration can also be favorably corrected.

In the electronic imaging apparatus according to the present invention, the zoom optical system preferably includes, in order from the object side, the first lens unit with positive power, the second lens unit with negative power, the aperture stop, the third lens unit with positive power, and the fourth lens unit with positive power. Upon zooming from the wide-angle region to the telephoto region, a spacing between the first lens unit and the second lens unit is widened, a spacing between the second lens unit and the third lens unit is narrowed, a spacing between the third lens unit and the fourth lens unit is widened, a spacing between the fourth lens unit and an electronic image sensor is changed, and the stop is moved integrally with the third lens unit.

By this arrangement, a simple structure and a high variable magnification ratio can be obtained. Specifically, contributions of the first, second, and third lens units to zooming are properly shared among them and the position of the image plane is adjusted by the fourth lens unit. The optical system suitable for this is obtained.

In the electronic imaging apparatus according to the present invention, the fourth lens unit is preferably a single positive lens element. By this arrangement, a lens configuration that has the function of mainly adjusting the position of the image plane is simplified, which is favorable.

Here, a description will be given of a fundamental conception for digitally correcting image distortion.

For example, as shown in FIG. 1, the magnification on a circle (image height) of a radius R, with an intersection of the optical axis and the imaging surface as a center, coming into contact with the major sides of the effective imaging surface is made constant and this circle is used as a reference of correction. Individual points on circles (image heights) of given radii $r(\omega)$ other than the radius R are almost radially moved. In this case, the individual points are moved concentrically so that the radii $r(\omega)$ become radii $r'(\omega)$. By doing so, the image distortion is corrected. In FIG. 1, for example, a point $P_1$ on the circle of a given radius $r_1(\omega)$ located inside the circle of the radius R is moved to a point $P_2$ on the circle of a radius $r_1'(\omega)$ to be corrected toward the center of the circle. A point $Q_1$ on the circle of a given radius $r_2(\omega)$ located outside the circle of the radius R is moved to a point $Q_2$ on the circle of a radius $r_2'(\omega)$ to be corrected in a direction separating from the center of the circle.

Here, the radius $r'(\omega)$ can be expressed as follows:

$$r'(\omega) = \alpha f \tan \omega \, (0 \leq \alpha \leq 1)$$

where $\omega$ is the half angle of view of the object and $f$ is the focal length of an imaging optical system (the zoom optical system in the present invention).

Here, when an ideal image height corresponding to a point on the circle (the image height) of the radius R is represented by Y, the following relation is obtained:

$$\alpha = R/Y = R/f \tan \omega$$

Ideally, the optical system is rotationally symmetrical about the optical axis. Hence, distortion is also produced rotationally symmetrical about the optical axis. Thus, when distortion optically produced is electrically corrected as mentioned above, the magnification on the circle (the image height) of the radius R, with an intersection of the optical axis and the imaging surface as a center, coming into contact with the major sides of the effective imaging surface is made constant on a reproduced image. Then, individual points on the circles (image heights) of the radii $r(\omega)$ other than the radius R are almost radially moved. In this case, the individual points are moved concentrically so that the radii $r(\omega)$ become the radii $r'(\omega)$. By doing so, when the image distortion can be corrected, it is considered that this is advantageous for amounts of data and calculation.

However, an optical image, when picked up by the electronic image sensor, ceases to be continuous (for sampling). Strictly speaking, therefore, unless the pixels of the electronic image sensor are radially arrayed, the circle of the radius R drawn on the optical image ceases to be accurate at all. That is, in the form correction of the image data indicated by individual points of discrete coordinates, there is no pixel corresponding to the circle that the magnification can be made constant. It is thus good practice to use a method of determining coordinates $(X_i', Y_j')$ of a moved point in accordance with coordinates $(X_i, Y_j)$ of each pixel. In the case where at least two points of the coordinates $(X_i, Y_j)$ are moved to the coordinates $(X_i', Y_j')$, the average value of coordinates of pixels is taken. When there is no moving point, it is only necessary that the values of the coordinates $(X_i', Y_j')$ of some surrounding pixels are used for interpolation.

Such a method is particularly effective for correction where considerable image distortion is produced with respect to the optical axis because of manufacturing errors of the optical system and the electronic image sensor, and the circle of the radius R drawn on the optical image becomes asymmetrical. This method is also effective for correction where, in the image sensor or various output devices, geometrical distortion is produced when a signal is reproduced as an image. When a toric surface or other rotationally asymmetrical surfaces are applied, the prism can be further downsized and a further slim design of the electronic imaging apparatus is possible. In this case also, this correcting method is effective.

In order to calculate the amount of correction, $r'(\omega) - r(\omega)$, the electronic imaging apparatus of the present invention may be constructed so that the relationship between the radius r (ω), namely the half angle of view and the image height or between a real image height r and an ideal image height r'/α is recorded in a recording medium housed in the electronic imaging apparatus. Also, in order to obtain an image after correction for distortion so that the amount of light does not suffer a serious shortage at both ends of each minor side, it is favorable that the radius R satisfies the following condition:

$$0 \leq R \leq 0.6 Ls$$

where Ls is the length of the minor side of the effective imaging surface.

The radius R should preferably satisfy the following condition:

$$0.3 Ls \leq R \leq 0.6 Ls$$

It is most advantageous that the radius R is made to practically coincide with the radius of a circle coming into contact with the minor sides of the effective imaging surface. Also, when correction is made by holding the magnification constant in the proximity of the radius R=0, namely in axial proximity, the effect of a compact design can be ensured even in a wide-angle design, although somewhat disadvantageous for a substantial number of images.

Also, a focal-length section requiring correction is divided into some focal zones. Correction may be made by the same amount of correction that the result of correction practically satisfying the following relation is obtained in the proximity of the telephoto position within each of divided focal zones:

$$r'(\omega) = \alpha f \tan \omega$$

In this case, however, the amount of barrel distortion remains to some extent at the wide-angle position in each divided focal zone. If the number of divided zones is increased, inherent data required for correction must be excessively stored in the recording medium, which is not very favorable. Thus, one or several coefficients relating to the focal length in each divided focal zone are previously calculated. It is only necessary that such a coefficient is determined on the basis of the measurement by a simulation or actual equipment. The amount of correction is calculated so that the result of correction practically satisfying the following relation is obtained in the proximity of the telephoto position within each divided focal zones:

$$r'(\omega) = \alpha f \tan \omega$$

The amount of correction may be evenly multiplied by the coefficient in accordance with the focal length to obtain the final amount of correction.

When an image obtained by imaging an infinite object is free of distortion, the following relation is established:

$$f = y/\tan \omega$$

where y is a height of an image point from the optical axis (an image height) and ω is an angle (a half angle of view of the object) made by a direction of an object point corresponding to an image point, connecting the center of the effective imaging surface and the position of the image height y, with the optical axis.

When barrel distortion is produced in the imaging system, the following condition is set:

$$f > y/\tan \omega$$

That is, when the focal length f and the image height y are made constant, the value of the angle ω becomes large.

The following condition determines the extent of barrel distortion at the wide-angle position in the zoom optical system.

$$0.85 < |y_{07}/(fw \cdot \tan \omega_{07w})| < 0.97 \quad (1')$$

Figure 2:
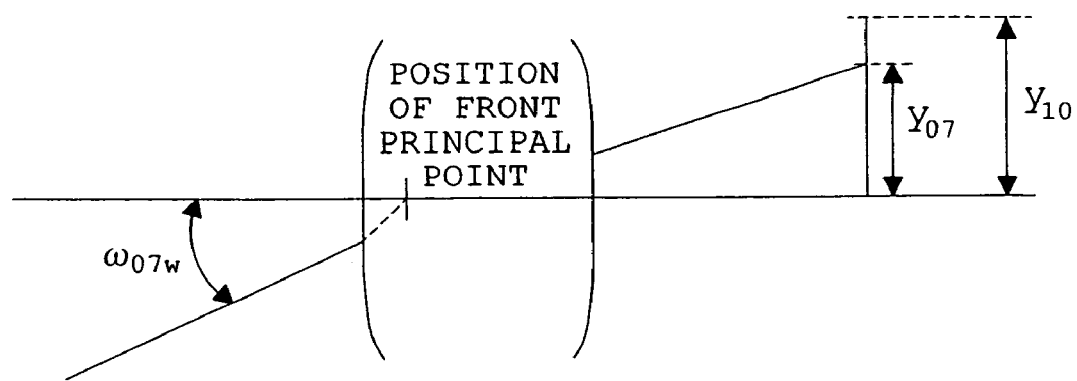
FIG. 2 is an explanatory view showing the relationship between an angle of incidence of light made with the optical axis and an image height.

More specifically, as shown in FIG. 2, $\omega_{07w}$ is an angle on the object side, made by the chief ray passing through the point of the image height $y_{07}$ with the optical axis, that is, an angle made by the chief ray directed toward the position of the front principal point of the zoom optical system from the object side with the optical axis.

When the zoom optical system satisfies Condition (1"), the compact design of the optical system is maintained and at the same time, an image can be obtained over a wide field angle. Furthermore, when the image is processed through the signal processing system incorporated in the electronic imaging apparatus, image distortion caused by distortion of the optical system can be corrected without increasing an enlargement ratio in a radial direction on the periphery of the angle of view or recognizing the deterioration of sharpness on the image periphery.

In the present invention, distortion is intentionally produced in the optical system, and the image, after being picked up by the electronic image sensor, is electrically processed so that distortion is corrected. This is done for the purpose of fulfilling the compact design, the wide-angle design, and the high variable magnification design of the optical system. In the present invention, therefore, it is also important that the optical system is chosen so that the optical system itself does not have unnecessary size.

When the object-side lens element of the first lens unit, like the present invention, is configured as a single negative lens element whose both surfaces are concave, an increase in lens thickness can be suppressed. When the negative power of the single negative lens element whose both surfaces are concave is strengthened, a wider angle of view can be obtained and downsizing of the lens diameter can be attained. Furthermore, off-axis chromatic aberration and coma at the wide-angle position can be efficiently corrected.

When the optical system, like the present invention, is designed so that the optical axis is bent by the reflecting member provided in the first lens unit, a structure such that a lens section is not shifted from the imaging apparatus can be obtained. This is convenient for the slim design of the imaging apparatus and a reduction of setup time from switching the power source on. It is also convenient for water- and dust-proof design.

When the positive lens component, like the present invention, is placed on the image side of the reflecting member in the first lens unit, a ray height is reduced and the lens diameter of each lens unit located behind the second lens unit can be decreased.

When the power of the positive lens component located on the image-sensor side of the reflecting member in the first lens unit is adjusted, the total length of the optical system can be reduced. It is desirable that the positive lens component of the first lens unit is a single lens element. Also, the positive lens component of the first lens unit may be configured as a biconvex lens element.

When the positive lens component of the first lens unit is configured as the biconvex lens element, the ray height can be made lower.

As in the present invention, coma can be corrected by the negative lens element whose both surfaces are concave, located at the object-side position in the first lens unit, while chromatic aberration can be corrected by the positive lens component located on the image-sensor side of the reflecting member.

Further, when correction for distortion due to image processing is combined, the effect of correction for aberration can be improved.

Specifically, as in the electronic imaging apparatus of the present invention, the image processing section electronically processing image data obtained by the electronic image sensor to change the form thereof is provided, and thereby distortion for which correction becomes difficult here is corrected at an image processing step and the quality of the entire image can be improved.

As mentioned above, in the electronic imaging apparatus loaded with the zoom optical system of a high zoom ratio, the present invention makes the slim design regarding the depth direction compatible with the wide-angle design. In particular, an image having considerable barrel distortion intentionally produced at the focal length in the proximity of the wide-angle position of the zoom lens is formed on the electronic image sensor. By doing so, it becomes possible to acquire the information of a wide angle of view without making the optical system bulky. The barrel-distorted image is photoelectrically converted into image data through the image sensor. The image data is electrically altered and processed in accordance with a form change (image distortion) through a signal processing system housed in the electronic imaging apparatus. By doing so, when the image data finally output from the electronic imaging apparatus is reproduced on a display device, the image distortion is digitally corrected and an image very similar to the profile of the object is obtained.

At the image processing step, correction for distortion, in contrast with correction for coma, can be made without imposing a load on a system.

The fundamental conception for digitally correcting the image distortion is as described with respect to FIG. 1.

Each of Conditions (10) and (11) determines the extent of barrel distortion at the wide-angle position of the zoom optical system.

If the values of $|y_{07}/(fw \cdot \tan \omega_{07w})|$ and $|y_{10}/(fw \cdot \tan \omega_{10w})|$ are beyond the upper limits of Conditions (10) and (11), respectively, the diameter and thickness of each lens unit will be increased, which is unfavorable.

On the other hand, if the values of $|y_{07}/(fw \cdot \tan \omega_{07w})|$ and $|y_{10}/(fw \cdot \tan \omega_{10w})|$ are below the lower limits of Conditions (10) and (11), respectively, the image will show considerable distortion and, in correction by electric image processing, the degradation of resolution of the image on an image periphery will be increased, which is unfavorable.

The present invention satisfies Condition (12).

By satisfying Condition (12), the influence of the degradation of image quality by electric image processing can be kept to a minimum.

Therefore, by satisfying all of Conditions (10), (11), and (12), a good balance between the degradation of image quality and the compact design of the optical system can be held.

If the value of $|y_{07}/(fw \cdot \tan \omega_{07w}) - y_{10}/(fw \cdot \tan \omega_{10w})|$ is beyond the upper limit of Condition (12), the degradation of image quality on the image periphery becomes pronounced due to electric image processing. This is unfavorable.

On the other hand, if the value of $|y_{07}/(fw \cdot \tan \omega_{07w}) - y_{10}/(fw \cdot \tan \omega_{10w})|$ is below the lower limit of Condition (12), the diameter and thickness of each lens unit will be increased, which is unfavorable.

It is more desirable to satisfy the following condition:

$$0.05 < |y_{07}/(fw \cdot \tan \omega_{07w}) - y_{10}/(fw \cdot \tan \omega_{10w})| < 0.10 \tag{12'}$$

In the present invention, distortion is intentionally produced in the optical system, and the image, after being picked up by the electronic image sensor, is electrically processed so that distortion is corrected. This is done for the purpose of fulfilling the compact design, the wide-angle design, and the high variable magnification design of the optical system. In the present invention, therefore, it is also important that the optical system is chosen so that the optical system itself does not have an unnecessary size.

As in the present invention, it is desirable to satisfy Condition (13).

Condition (13) expresses the shape of the negative lens element whose both surfaces are concave in the first lens unit.

If the value of (R11+R12)/(R11−R12) is beyond the upper limit of Condition (13), the sag amount of the radius of curvature R12 will be increased and the thickness of the first lens unit becomes large. Alternatively, the power of the radius of curvature R11 will be lessened and it becomes difficult to ensure a satisfactory angle of view, which is unfavorably.

On the other hand, if the value of (R11+R12)/(R11−R12) is below the lower limit of Condition (13), the sag amount of the radius of curvature R11 will be increased and the lens thickness becomes large. Alternatively, the power of the radius of curvature R12 will be lessened and it becomes difficult to ensure a satisfactory angle of view, which is unfavorably.

It is further desirable to satisfy the following condition:

$$0.40 < (R11+R12)/(R11-R12) < 0.8 \tag{13'}$$

As in the present invention, it is desirable to satisfy Condition (14).

By satisfying Condition (14), the sag amounts of the radii of curvature R11 and R12 can be made smaller, which is favorable for the compact design.

As in the present invention, it is desirable to satisfy Condition (15).

Condition (15) normalizes the focal length of the first lens unit with the focal length of the entire optical system at the wide-angle position. By satisfying Condition (15), the compact design and the high-performance design can be attained.

If the value of $f_1/f_w$ is beyond the upper limit of Condition (15), the power of the first lens unit will be increased, which is unfavorable for correcting spherical aberration and coma.

On the other hand, if the value of $f_1/fw$ is below the lower limit of Condition (15), the power of the first lens unit will be lessened, which is unfavorable for reducing the thickness and diameter of the first lens unit.

It is more desirable to satisfy the following condition:

$$-2.0 < f_1/fw < -1.0 \tag{15'}$$

As in the present invention, when the first lens unit, upon zooming from the wide-angle position to the telephoto position, is fixed with respect to the image plane, the structure of a holding portion including the first lens unit and the image sensor can be simplified, and this is convenient for water- and dust-proof design.

When the third lens unit, upon zooming from the wide-angle position to the telephoto position, is fixed, an increase of the outside diameter of the lens unit located on the image side of the third lens unit can be suppressed.

In the present invention, the zoom optical system includes, in order from the object side, a first lens unit with positive refracting power, a second lens unit with negative refracting power, a third lens unit with positive refracting power, and a fourth lens unit with positive refracting power. In this case, the zoom optical system may be arranged so that, upon zooming from the wide-angle position to the telephoto position, the first lens unit is fixed with respect to the image plane, the second lens unit is moved toward the image side, the third lens unit is moved toward the object side, and the fourth lens unit is moved to hold a more image-side position at the telephoto position than at the wide-angle position.

Alternatively, in the present invention, the zoom optical system includes, in order from the object side, a first lens unit with positive refracting power, a second lens unit with negative refracting power, a third lens unit with positive refracting power, and a fourth lens unit with negative refracting power. In this case, the zoom optical system may also be arranged so that, upon zooming from the wide-angle position to the telephoto position, the first lens unit is fixed with respect to the image plane, the second lens unit is moved toward the image side, the third lens unit is moved toward the object side, and the fourth lens unit is fixed.

In the present invention, the zoom optical system further includes a fifth lens unit with positive refracting power, located on the image side of the fourth lens unit, and may be arranged so that, upon zooming from the wide-angle position to the telephoto position, the fifth lens unit is fixed or moved toward the object side.

In addition, the zoom optical system may be designed to have five or six lens units.

In accordance with the drawings and numerical data, the embodiments of the present invention will be described below.

First Embodiment

Figure 3A:
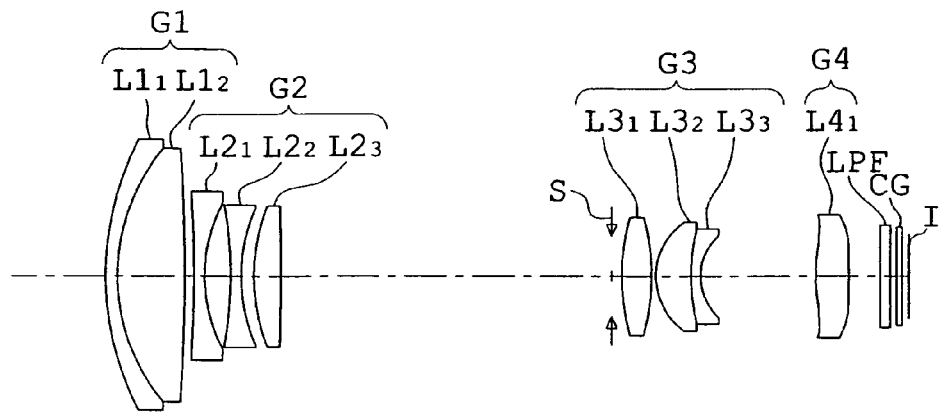
FIGS. 3A, 3B, and 3C are sectional views showing lens arrangements, developed along the optical axis, at wide-angle, middle, and telephoto positions, respectively, of the zoom optical system of a first embodiment in the present invention.
Figure 3B:
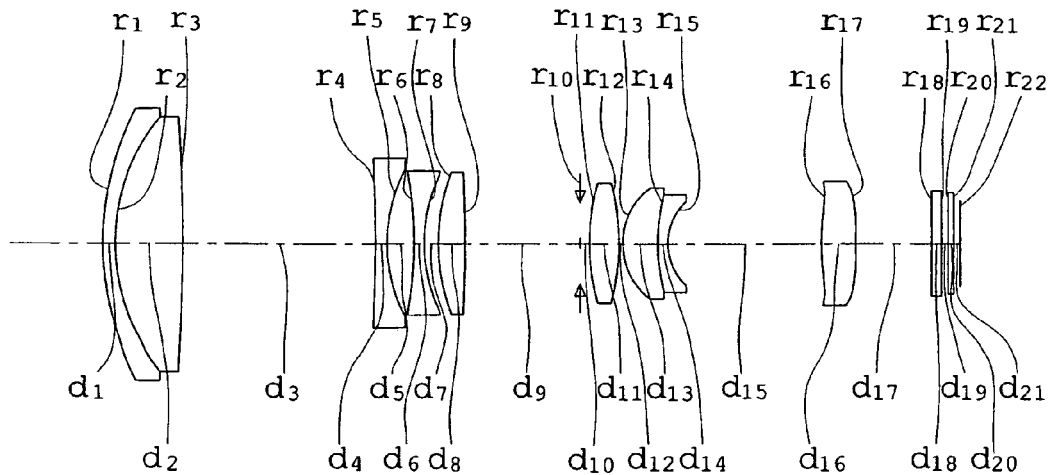
Figure 3C:
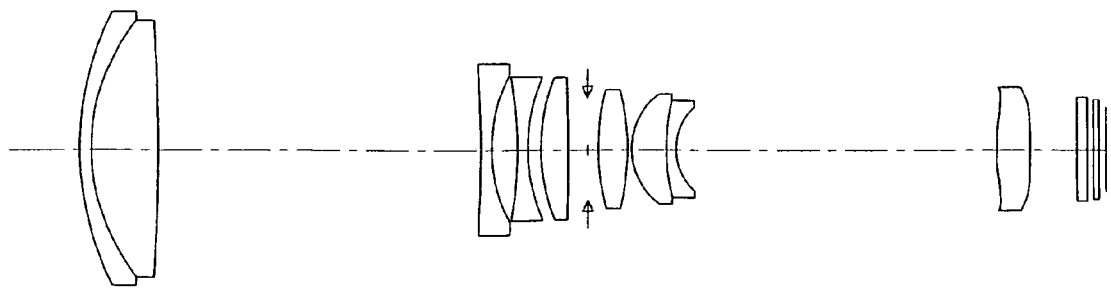

FIGS. 3A-3C show lens arrangements of the first embodiment of the zoom optical system according to the present invention. FIGS. 4A-4R show aberration characteristics of the zoom optical system in the first embodiment.

A four-lens-unit zoom optical system of the first embodiment comprises, in order from the object side, a first lens unit G1 with positive power, a second lens unit G2 with negative power, an aperture stop S, a third lens unit G3 with positive power, and a fourth lens unit G4 with positive power. Reference symbol LPF denotes an optical low-pass filter, CG denotes a cover glass, and I denotes the imaging surface of an electronic image sensor such as s CCD.

The first lens unit G1 with positive power is constructed with a cemented lens component having, in order from the object side, a first lens $L1_1$ with negative power and a second lens $L1_2$ with positive power. The first lens $L1_1$ with negative power is a meniscus lens with a convex surface facing the object side. The second lens $L1_2$ with positive power is a biconvex lens.

The second lens unit G2 with negative power includes, in order from the object side, a first lens $L2_1$ with negative power, a second lens $L2_2$ with negative power, and a third lens $L2_3$ with positive power. Each of the first lens $L2_1$ with negative power and the second lens $L2_2$ with negative power is a biconcave lens. The third lens $L2_3$ with positive power is a biconvex lens.

The third lens unit G3 with positive power includes a biconvex lens $L3_1$ whose both surfaces are aspherical and a cemented lens component having a positive meniscus lens $L3_2$ with a convex surface facing the object side and a negative meniscus lens $L3_3$ with a convex surface facing the object side.

The fourth lens unit G4 with positive power is constructed with a single convex lens $L4_1$ whose both surfaces are aspherical.

The first embodiment adopts a zoom system that, upon zooming from the wide-angle position to the telephoto position, individual lens units are moved so that a spacing between the first lens unit G1 and the second lens unit G2 is widened, a spacing between the second lens unit G2 and the third lens unit G3 is narrowed, a spacing between the third lens unit G3 and the fourth lens unit G4 is widened, and a spacing between the fourth lens unit G4 and the imaging surface I is changed. Specifically, the first lens unit G1 is continuously moved toward the object side, the second lens unit G2 is moved toward the image side along a locus that is convex toward the image side, the third lens unit G3 is continuously moved toward the object side, and the fourth lens unit G4 is moved toward the image side along a locus that is convex toward the object side. The stop S is moved integrally with the third lens unit G3.

Subsequently, numerical data of optical members constituting the zoom optical system in the first embodiment are shown below. In the data, R denotes the radius of curvature of each of the surfaces of the optical members; D, spacing between the surfaces; Nd, the refractive index of each optical member relating to the d line; Vd, the Abbe's number of each optical member; f, the focal length; FNO, the F-number; and ω, a half angle of view. Also, when z is taken as the coordinate in the direction of the optical axis, y is taken as the coordinate normal to the optical axis, r represents the radius of curvature of each lens surface, k represents a conic constant, and A4, A6, A8, A10, and A12 represent aspherical coefficients, the configuration of the aspherical surface is expressed by the following equation:

$$z = (y^2/r)/[1+\{1-(1+k)\times(y/r)^2\}^{1/2}]+A4y^4+A6y^6+A8y^8+A10y^{10}$$

Also, for example, the aspherical coefficient, A4=−1.08513e-04, can also be expressed as $A4=-1.08513\times10^{-4}$, but in the numerical data of the embodiment, the aspherical coefficient is expressed in the former form.

These symbols and expression forms are also used for the numerical data of individual embodiments to be described later.

Numerical data 1 f = 6.45~62.62 mm   FNO = 2.8~4.0   2ω = 66.02~6.45°

| Face No. | R | D | Nd | Vd |
|---|---|---|---|---|
| 1 | 26.071 | 1.00 | 1.90366 | 31.31 |
| 2 | 17.638 | 5.45 | 1.58313 | 59.38 |
| 3 | −234.532 | D3 | | |
| 4 | −131.562 | 0.90 | 1.88300 | 40.76 |
| 5 | 13.766 | 2.17 | | |
| 6 | −36.798 | 0.85 | 1.88300 | 40.76 |
| 7 | 14.357 | 1.13 | | |
| 8 | 17.738 | 2.23 | 1.92286 | 20.88 |
| 9 | −219.112 | D9 | | |
| 10 | ∞ (stop) | 0.80 | | |
| 11 | 17.263 (aspherical surface) | 2.45 | 1.69350 | 53.21 |
| 12 | −23.487 (aspherical surface) | 0.30 | | |
| 13 | 6.092 | 2.87 | 1.49700 | 81.54 |
| 14 | 16.537 | 0.81 | 1.78472 | 25.68 |
| 15 | 5.072 | D15 | | |
| 16 | 19.939 (aspherical surface) | 2.74 | 1.69350 | 53.21 |
| 17 | −67.409 (aspherical surface) | D17 | | |
| 18 | ∞ | 0.85 | 1.54771 | 62.84 |
| 19 | ∞ | 0.50 | | |

-continued

Numerical data 1

| | | | | |
|---|---|---|---|---|
| 20 | ∞ | 0.50 | 1.51633 | 64.14 |
| 21 | ∞ | 0.59 | | |
| 22 | ∞ (image plane) | | | |

Aspherical coefficients

| Face No. | R | k | | |
|---|---|---|---|---|
| 11 | 17.263 | 0.519 | | |
| | A4 | A6 | A8 | A10 |
| | −1.08513e−04 | −2.60333e−06 | −6.22120e−08 | 3.78788e−09 |

| Face No. | R | k | | |
|---|---|---|---|---|
| 12 | −23.487 | 0.000 | | |
| | A4 | A6 | A8 | A10 |
| | 4.03645e−08 | −3.45387e−06 | −2.25268e−09 | 2.87345e−09 |

| Face No. | R | k | | |
|---|---|---|---|---|
| 16 | 19.939 | 0.000 | | |
| | A4 | A6 | A8 | A10 |
| | −4.27706e−04 | 3.80104e−06 | −6.83332e−07 | 6.53058e−09 |

| Face No. | R | k | | |
|---|---|---|---|---|
| 17 | −67.409 | 0.000 | | |
| | A4 | A6 | A8 | A10 |
| | −5.03999e−04 | 3.47461e−06 | −6.12156e−07 | 9.23438e−09 |

Zoom data 1

| | Wide-angle position | Middle position | Telephoto position |
|---|---|---|---|
| Focal length | 6.450 | 20.097 | 62.620 |
| FNO | 2.80 | 3.42 | 4.00 |
| Angle of view (2ω) | 66.02 | 20.32 | 6.45 |
| D3 | 0.80 | 15.93 | 26.22 |
| D9 | 27.16 | 9.49 | 1.50 |
| D15 | 9.40 | 12.54 | 26.21 |
| D17 | 2.58 | 6.29 | 3.94 |

Second Embodiment

Figure 5A:
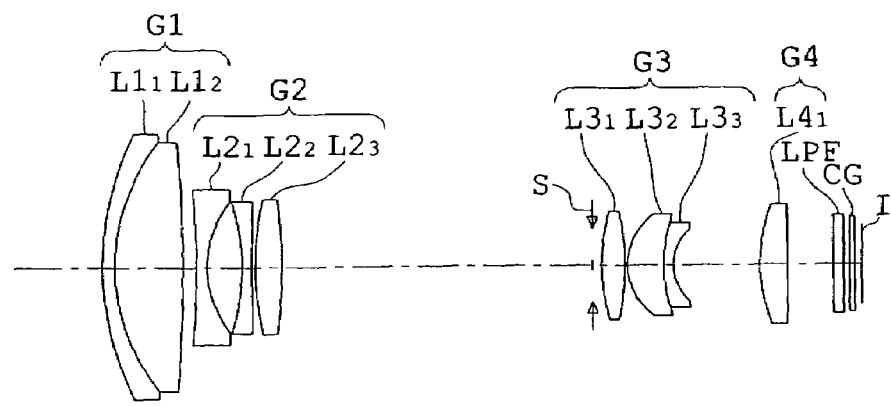
FIGS. 5A, 5B, and 5C are sectional views showing lens arrangements, developed along the optical axis, at wide-angle, middle, and telephoto positions, respectively, of the zoom optical system of a second embodiment in the present invention.
Figure 5B:
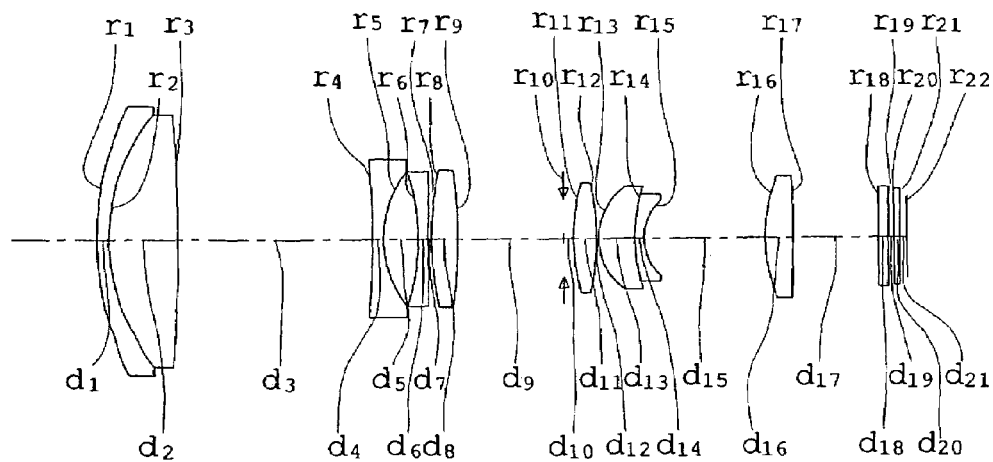
Figure 5C:
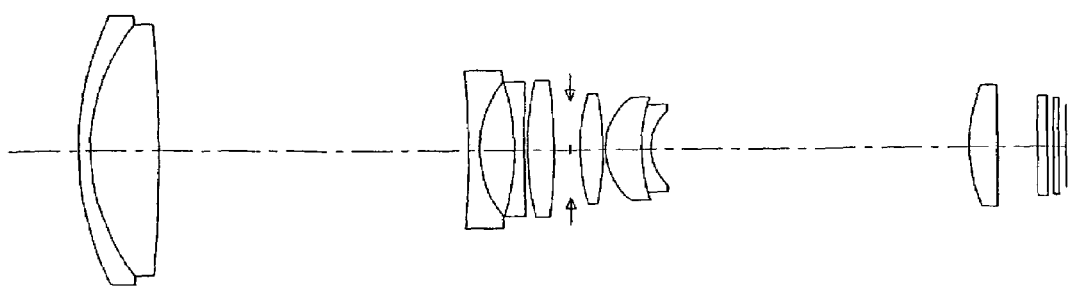

FIGS. 5A-5C show lens arrangements of the second embodiment of the zoom optical system according to the present invention. FIGS. 6A-6R show aberration characteristics of the zoom optical system in the second embodiment.

A four-lens-unit zoom optical system of the second embodiment comprises, in order from the object side, a first lens unit G1 with positive power, a second lens unit G2 with negative power, an aperture stop S, a third lens unit G3 with positive power, and a fourth lens unit G4 with positive power. Again, reference symbol LPF denotes an optical low-pass filter, CG denotes a cover glass, and I denotes the imaging surface of an electronic image sensor such as s CCD.

The first lens unit G1 with positive power is constructed with a cemented lens component having, in order from the object side, a first lens $L1_1$ with negative power and a second lens $L1_2$ with positive power. The first lens $L1_1$ with negative power is a meniscus lens with a convex surface facing the object side. The second lens $L1_2$ with positive power is a biconvex lens.

The second lens unit G2 with negative power includes, in order from the object side, a first lens $L2_1$ with negative power, a second lens $L2_2$ with negative power, and a third lens $L2_3$ with positive power. Each of the first lens $L2_1$ with negative power and the second lens $L2_2$ with negative power is a biconcave lens. The third lens $L2_3$ with positive power is a biconvex lens.

The third lens unit G3 with positive power includes a biconvex lens $L3_3$ whose both surfaces are aspherical and a cemented lens component having a positive meniscus lens $L3_2$ with a convex surface facing the object side and a negative meniscus lens $L3_3$ with a convex surface facing the object side.

The fourth lens unit G4 with positive power is constructed with a single positive meniscus lens $L4_1$ whose both surfaces are aspherical, with a convex surface facing the object side.

The second embodiment adopts a zoom system that, upon zooming from the wide-angle position to the telephoto position, individual lens units are moved so that the spacing between the first lens unit G1 and the second lens unit G2 is widened, the spacing between the second lens unit G2 and the third lens unit G3 is narrowed, the spacing between the third lens unit G3 and the fourth lens unit G4 is widened, and the spacing between the fourth lens unit G4 and the imaging surface I is changed. Specifically, the first lens unit G1 is continuously moved toward the object side, the second lens unit G2 is moved toward the image side along a locus that is convex toward the image side, the third lens unit G3 is continuously moved toward the object side, and the fourth lens unit G4 is moved toward the image side along a locus that is convex toward the object side. The stop S is moved integrally with the third lens unit G3.

Subsequently, numerical data of optical members constituting the zoom optical system in the second embodiment are shown below.

Numerical data 2 f = 6.45~62.62 mm    FNO = 2.9~4.4    2ω = 65.05~6.44°

| Face No. | R | D | Nd | Vd |
|---|---|---|---|---|
| 1 | 27.043 | 1.00 | 1.90366 | 31.31 |
| 2 | 17.992 | 5.67 | 1.58313 | 59.38 |
| 3 | −176.534 | D3 | | |
| 4 | −82.525 | 0.90 | 1.88300 | 40.76 |
| 5 | 9.800 | 3.00 | | |
| 6 | −19.428 | 0.85 | 1.88300 | 40.76 |
| 7 | 153.200 | 0.28 | | |
| 8 | 26.911 | 2.33 | 1.92286 | 20.88 |
| 9 | −46.890 | D9 | | |
| 10 | ∞ (stop) | 0.80 | | |
| 11 | 16.716 | 1.97 | 1.69350 | 53.21 |
| | (aspherical surface) | | | |
| 12 | −27.193 | 0.20 | | |
| | (aspherical surface) | | | |
| 13 | 5.768 | 3.15 | 1.49700 | 81.54 |
| 14 | 14.613 | 0.81 | 1.78472 | 25.68 |
| 15 | 4.564 | D15 | | |
| 16 | 13.750 | 2.37 | 1.69350 | 53.21 |
| | (aspherical surface) | | | |
| 17 | 125.603 | D17 | | |
| | (aspherical surface) | | | |
| 18 | ∞ | 0.85 | 1.54771 | 62.84 |
| 19 | ∞ | 0.50 | | |
| 20 | ∞ | 0.50 | 1.51633 | 64.14 |

-continued

Numerical data 2

| | | |
|---|---|---|
| 21 | ∞ | 0.59 |
| 22 | ∞ (image plane) | |

Aspherical coefficients

| Face No. | R | k | | |
|---|---|---|---|---|
| 11 | 16.716 | 0.318 | | |

| A4 | A6 | A8 | A10 |
|---|---|---|---|
| −2.18412e−05 | −1.54029e−05 | 6.85813e−07 | −9.55571e−09 |

| Face No. | R | k | | |
|---|---|---|---|---|
| 12 | −27.193 | 3.878 | | |

| A4 | A6 | A8 | A10 |
|---|---|---|---|
| 1.07421e−04 | −1.61112e−05 | 7.49466e−07 | −1.06157e−08 |

| Face No. | R | k | | |
|---|---|---|---|---|
| 16 | 13.750 | 0.274 | | |

| A4 | A6 | A8 | A10 |
|---|---|---|---|
| −1.22020e−04 | 6.36520e−06 | −8.03263e−07 | 1.80694e−08 |

| Face No. | R | k | | |
|---|---|---|---|---|
| 17 | 125.603 | −39.653 | | |

| A4 | A6 | A8 | A10 |
|---|---|---|---|
| −1.43419e−04 | 8.48691e−06 | −1.08306e−06 | 2.65147e−08 |

Zoom data 2

| | Wide-angle position | Middle position | Telephoto position |
|---|---|---|---|
| Focal length | 6.450 | 20.097 | 62.620 |
| FNO | 2.85 | 3.52 | 4.40 |
| Angle of view (2ω) | 65.05 | 20.13 | 6.44 |
| D3 | 1.10 | 16.56 | 26.45 |
| D9 | 26.52 | 8.85 | 1.50 |
| D15 | 7.46 | 10.35 | 26.88 |
| D17 | 3.84 | 7.25 | 3.40 |

Third Embodiment

Figure 7A:
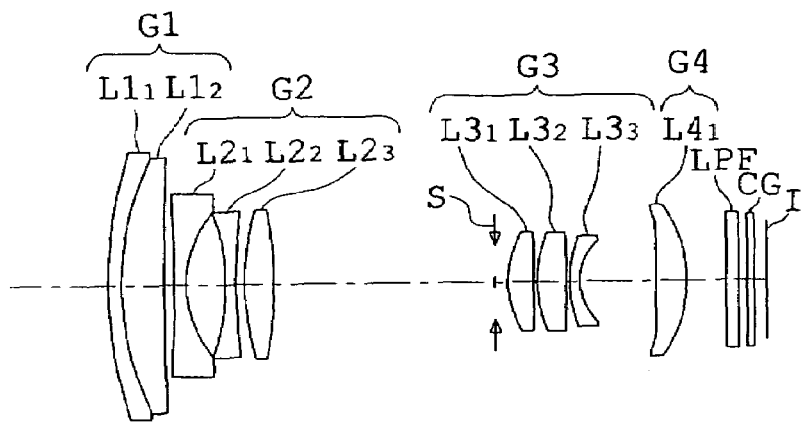
FIGS. 7A, 7B, and 7C are sectional views showing lens arrangements, developed along the optical axis, at wide-angle, middle, and telephoto positions, respectively, of the zoom optical system of a third embodiment in the present invention.
Figure 7B:
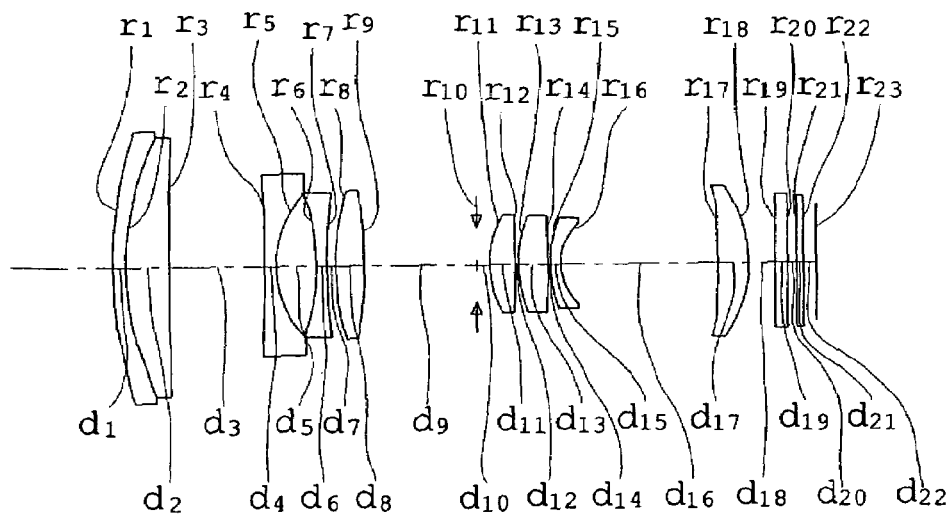
Figure 7C:
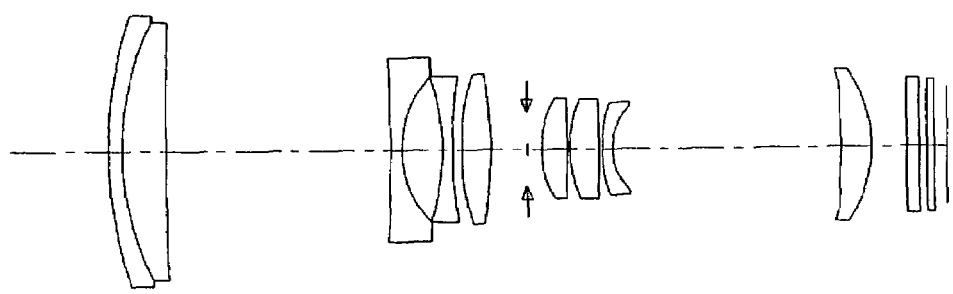

FIGS. 7A-7C show lens arrangements of the third embodiment of the zoom optical system according to the present invention. FIGS. 8A-8R show aberration characteristics of the zoom optical system in the third embodiment.

A four-lens-unit zoom optical system of the third embodiment comprises, in order from the object side, a first lens unit G1 with positive power, a second lens unit G2 with negative power, an aperture stop S, a third lens unit G3 with positive power, and a fourth lens unit G4 with positive power. Again, reference symbol LPF denotes an optical low-pass filter, CG denotes a cover glass, and I denotes the imaging surface of an electronic image sensor such as s CCD.

The first lens unit G1 with positive power is constructed with a cemented lens component having, in order from the object side, a first lens $L1_1$ with negative power and a second lens $L1_2$ with positive power. The first lens $L1_1$ with negative power is a meniscus lens with a convex surface facing the object side. The second lens $L1_2$ with positive power is a biconvex lens.

The second lens unit G2 with negative power includes, in order from the object side, a first lens $L2_1$ with negative power, a second lens $L2_2$ with negative power, and a third lens $L2_3$ with positive power. Each of the first lens $L2_1$ with negative power and the second lens $L2_2$ with negative power is a biconcave lens. The third lens $L2_3$ with positive power is a biconvex lens.

The third lens unit G3 with positive power includes a biconvex lens $L3_1$ whose both surfaces are aspherical, a biconvex lens $L3_2$, and a negative meniscus lens $L3_3$ with a convex surface facing the object side.

The fourth lens unit G4 with positive power is constructed with a single positive meniscus lens $L4_1$ whose both surfaces are aspherical, with a concave surface facing the object side.

The third embodiment adopts a zoom system that, upon zooming from the wide-angle position to the telephoto position, individual lens units are moved so that the spacing between the first lens unit G1 and the second lens unit G2 is widened, the spacing between the second lens unit G2 and the third lens unit G3 is narrowed, the spacing between the third lens unit G3 and the fourth lens unit G4 is widened, and the spacing between the fourth lens unit G4 and the imaging surface I is changed. Specifically, the first lens unit G1 is continuously moved toward the object side, the second lens unit G2 is moved toward the image side, the third lens unit G3 is continuously moved toward the object side, and the fourth lens unit G4 is moved toward the image side along a locus that is convex toward the image side. The stop S is moved integrally with the third lens unit G3.

Subsequently, numerical data of optical members constituting the zoom optical system in the third embodiment are shown below.

Numerical data 3 f = 6.01~25.31 mm    FNO = 2.9~4.8    2ω = 85.76~19.92°

| Face No. | R | D | Nd | Vd |
|---|---|---|---|---|
| 1 | 34.873 | 1.00 | 1.92286 | 20.88 |
| 2 | 22.864 | 3.30 | 1.83481 | 42.71 |
| 3 | 204.162 | D3 | | |
| 4 | −125.571 | 0.90 | 1.88300 | 40.76 |
| 5 | 8.609 | 3.07 | | |
| 6 | −16.998 | 0.85 | 1.81600 | 46.62 |
| 7 | 42.304 | 0.66 | | |
| 8 | 21.738 | 2.20 | 1.84666 | 23.78 |
| 9 | −36.445 | D9 | | |
| 10 | ∞ (stop) | 1.00 | | |
| 11 | 7.447 (aspherical surface) | 2.00 | 1.58913 | 61.25 |
| 12 | −59.575 (aspherical surface) | 0.20 | | |
| 13 | 9.611 | 2.30 | 1.49700 | 81.54 |
| 14 | −103.248 | 0.21 | | |
| 15 | 10.479 | 0.80 | 1.84666 | 23.78 |
| 16 | 4.383 | D16 | | |
| 17 | −59.764 (aspherical surface) | 2.30 | 1.58313 | 59.46 |
| 18 | −10.909 (aspherical surface) | D18 | | |
| 19 | ∞ | 0.95 | 1.54771 | 62.84 |
| 20 | ∞ | 0.60 | | |

-continued

Numerical data 3

| | | | | | |
|---|---|---|---|---|---|
| 21 | ∞ | | 0.50 | 1.51633 | 64.14 |
| 22 | ∞ | | 1.00 | | |
| 23 | ∞ (image plane) | | | | |

Aspherical coefficients

| Face No. | R | k | | |
|---|---|---|---|---|
| 11 | 7.447 | −0.035 | | |

| | A4 | A6 | A8 | A10 |
|---|---|---|---|---|
| | −2.94197e−04 | 8.25797e−06 | −6.85609e−07 | 3.41100e−08 |

| Face No. | R | k | | |
|---|---|---|---|---|
| 12 | −59.575 | 54.981 | | |

| | A4 | A6 | A8 | A10 |
|---|---|---|---|---|
| | 2.21511e−04 | 8.90917e−06 | −4.52900e−07 | 3.02400e−08 |

| Face No. | R | k | |
|---|---|---|---|
| 17 | −59.764 | 0.000 | |

| | A4 | A6 | A8 |
|---|---|---|---|
| | 7.26328e−05 | −3.17475e−06 | −1.22149e−07 |

| Face No. | R | k | |
|---|---|---|---|
| 18 | −10.909 | 0.000 | |

| | A4 | A6 | A8 | A10 |
|---|---|---|---|---|
| | 3.57489e−04 | −1.17288e−05 | 9.02385e−08 | −1.65334e−09 |

Zoom data 3

| | Wide-angle position | Middle position | Telephoto position |
|---|---|---|---|
| Focal length | 6.014 | 12.255 | 25.308 |
| FNO | 2.88 | 3.83 | 4.77 |
| Angle of view (2ω) | 85.76 | 40.73 | 19.92 |
| D3 | 0.80 | 7.42 | 16.95 |
| D9 | 16.72 | 8.30 | 2.63 |
| D16 | 5.98 | 12.11 | 17.50 |
| D18 | 3.04 | 2.05 | 2.65 |

Next, values of conditions in the first to third embodiments are shown in Table 1. Also, in Table 1, $\beta 4w$ is the magnification of the fourth lens unit at the wide-angle position, $\beta 4t$ is the magnification of the four the lens unit at the telephoto position, $\beta 34w$ is a combined magnification of the third and fourth lens units at the wide-angle position, $\beta 34t$ is a combined magnification of the third and fourth lens units at the telephoto position, and $f_1$, $f_2$, $f_3$, and $f_4$ are focal lengths of the first, second, third, and fourth lens units, respectively.

TABLE 1

| | 1st embodiment | 2nd embodiment | 3rd embodiment |
|---|---|---|---|
| fw | 6.45 | 6.45 | 6.01 |
| ft | 62.62 | 62.62 | 25.18 |
| $y_{07}$ | 2.52 | 2.52 | 3.16 |

TABLE 1-continued

| | 1st embodiment | 2nd embodiment | 3rd embodiment |
|---|---|---|---|
| $y_{10}$ | 3.60 | 3.60 | 4.51 |
| $\tan \omega_{07w}$ | −0.42 | −0.42 | −0.57 |
| $\tan \omega_{10w}$ | −0.65 | −0.64 | −0.93 |
| $\beta 2w$ | −0.29 | −0.31 | −0.25 |
| $\beta 2t$ | −0.96 | −0.98 | −0.41 |
| $\beta 3w$ | −0.57 | −0.60 | −0.60 |
| $\beta 3t$ | −1.84 | −1.76 | −1.46 |
| $\beta 4w$ | 0.74 | 0.67 | 0.77 |
| $\beta 4t$ | 0.68 | 0.69 | 0.78 |
| $\beta 34w$ | −0.42 | −0.40 | −0.46 |
| $\beta 34t$ | −1.25 | −1.21 | −1.14 |
| R21 | −131.56 | −82.52 | −125.57 |
| R22 | 13.77 | 9.80 | 8.61 |
| R23 | 17.74 | 26.91 | 21.74 |
| R24 | −219.11 | −46.89 | −36.45 |
| $n_{dA2}$ | 1.88 | 1.88 | 1.88 |
| $f_1$ | 52.31 | 52.71 | 53.19 |
| $f_2$ | −10.67 | −11.27 | −9.89 |
| $f_3$ | 15.36 | 15.84 | 12.53 |
| $f_4$ | 22.48 | 22.07 | 22.49 |
| ft/fw | 9.71 | 9.71 | 4.19 |
| $\|y_{07}/(fw \cdot \tan \omega_{07w})\|$ | 0.93 | 0.94 | 0.91 |
| $\|y_{10}/(fw \cdot \tan \omega_{10w})\|$ | 0.86 | 0.88 | 0.81 |
| (R21 + R22)/(R21 − R22) | 0.81 | 0.79 | 0.87 |
| (R23 + R24)/(R23 − R24) | −0.85 | −0.27 | −0.25 |
| $\|y_{07}/(fw \cdot \tan \omega_{07w}) - y_{10}/(fw \cdot \tan \omega_{10w})\|$ | 0.07 | 0.06 | 0.11 |
| $\{(\beta 2t/\beta 2w) \cdot (\beta 3t/\beta 3w)\}/(ft/fw)$ | 1.09 | 0.97 | 0.98 |
| $(\beta 2t/\beta 2w)/(\beta 3t/\beta 3w)$ | 1.02 | 1.09 | 0.68 |
| LW | 66.08 | 64.7 | 50.37 |
| LT | 84 | 84 | 63.56 |
| DW | 0.8 | 1.1 | 0.8 |
| DT | 26.22 | 26.45 | 16.95 |
| (LT − LW)/(DT − DW) | 0.70 | 0.76 | 0.82 |

Fourth Embodiment

Figure 9A:
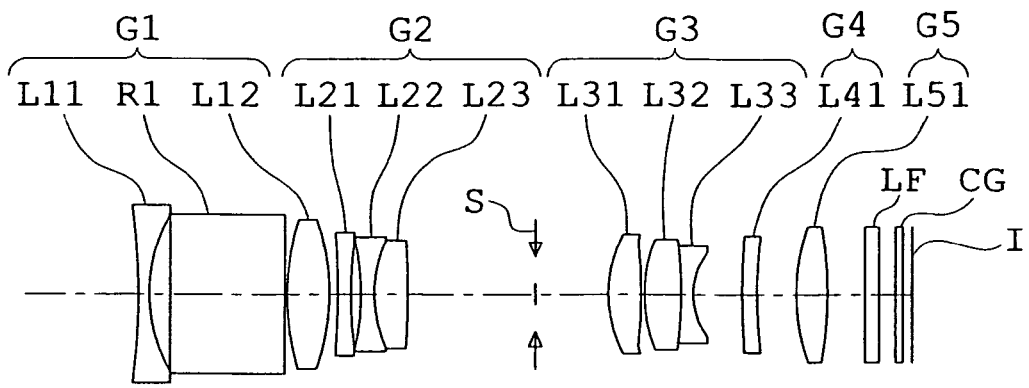
FIGS. 9A, 9B, and 9C are sectional views showing lens arrangements, developed along the optical axis, at wide-angle, middle, and telephoto positions, respectively, of the zoom optical system of a fourth embodiment in the present invention.
Figure 9B:
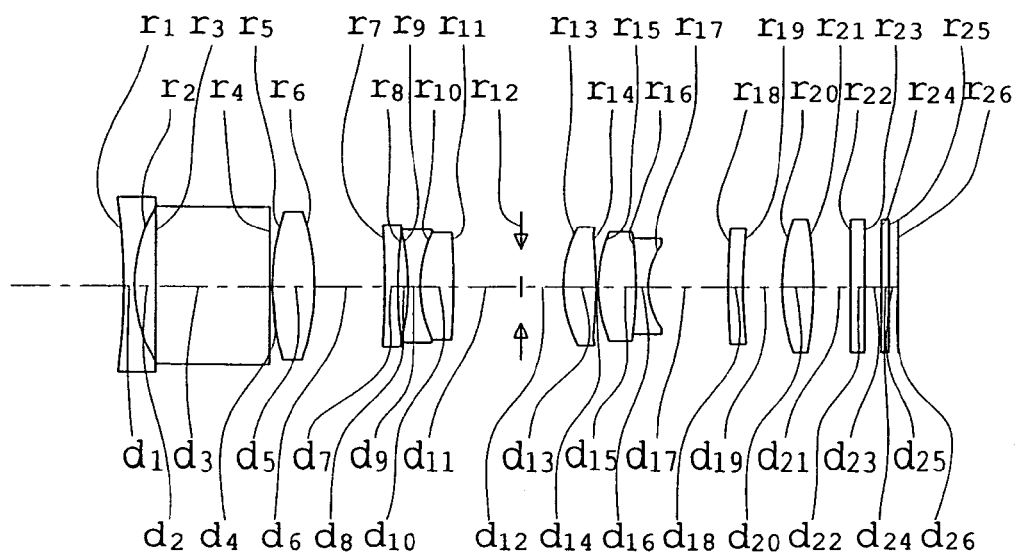
Figure 9C:
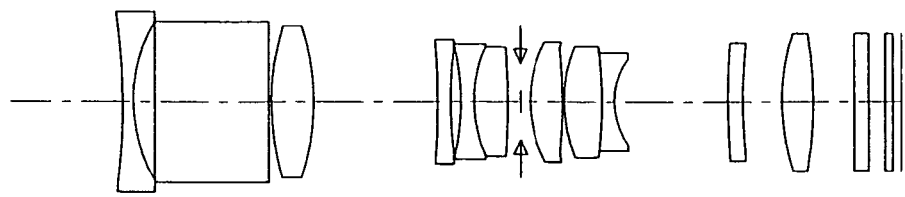

FIGS. 9A-9C show optical arrangements of the fourth embodiment of the zoom optical system used in the electronic imaging apparatus according to the present invention. FIGS. 10A-10R show aberration characteristics, in focusing of an infinite object point, of the zoom optical system in the fourth embodiment.

The zoom optical system of the fourth embodiment, as shown in FIGS. 9A-9C, comprises, in order from the object side, a first lens unit G1, a second lens unit G2, an aperture stop S, a third lens unit G3, a fourth lens unit G4, and a fifth lens unit G5. In FIGS. 9A-9C, again, reference symbol I denotes the imaging surface of an electronic image sensor such as a CCD. Between the fifth lens unit G5 and the imaging surface I, a plane-parallel optical low-pass filter LF and a CCD cover glass CG are provided.

The first lens unit G1 includes, in order from the object side, a single biconcave negative lens L11, a reflecting optical element (a reflecting member) R1 for bending the optical path, and a single biconvex positive lens L12, having positive refracting power as a whole.

The second lens unit G2 includes, in order from the object side, a biconcave negative lens L21 and a cemented lens component of a biconcave negative lens L22 and a biconvex positive lens L23, having negative refracting power as a whole. The third lens unit G3 includes a positive lens L31 configured into a biconvex shape in the proximity of the optical axis (at the lens center), located on the imaging-surface-I side of the second lens unit G2, with the aperture stop S between the second lens unit G2 and the third lens unit G3, and a cemented lens component of a biconvex positive lens L32 and a biconcave negative lens L33, having positive refracting power as a whole. The positive lens L31 is configured so that the negative power increases progressively in going from the lens center to the periphery.

The fourth lens unit G4 is constructed with a negative meniscus lens L41 with a convex surface facing the object side, having negative refracting power as a whole.

The fifth lens unit G5 is constructed with a biconvex positive lens L51, having positive refracting power as a whole.

Aspherical surfaces are used for both surfaces of the biconvex positive lens L12 in the first lens unit G1, both surfaces of the positive lens L31 configured into the biconvex shape in the third lens unit G3, and the object-side surface of the biconvex positive lens L51 in the fifth lens unit G5.

Upon zooming from the wide-angle position to the telephoto position, the first lens unit G1 is fixed in position, the second lens unit G2 is moved toward the image side at the telephoto position rather than at the wide-angle position, the aperture stop S is fixed in position, the third lens unit G3 is moved toward the object side at the telephoto position rather than at the wide-angle position, the fourth lens unit G4 is moved along a locus that is convex toward the image side, and the fifth lens unit G5 is fixed in position. In this case, spacings between individual lens units are changed so that a spacing $d_6$ between the first lens unit G6 and the second lens unit G2 is widened, spacings $d_{11}$ and $d_{12}$ between the second lens unit G2 and the third lens unit G3 are narrowed, a spacing $d_{17}$ between the third lens unit G3 and the fourth lens unit G4 is widened, and a spacing $d_{19}$ between the fourth lens unit G4 and the fifth lens unit G5 is narrowed in the range from the wide-angle position to the middle position and is widened in the range from the middle position to the telephoto position. Also, the imaging surface I is placed in the direction of an effective imaging diagonal of a CCD or a CMOS sensor.

Subsequently, numerical data of optical members constituting a variable magnification optical system of the fourth embodiment of the present invention are listed below.

Here, in the numerical data, $r_1$, $r_2$, . . . represent radii of curvature (mm) of surfaces of individual optical members; $d_1$, $d_2$, . . . represent thicknesses of individual optical members or air spacings (mm) between them; $n_{d1}$, $n_{d2}$, . . . represent refractive indices of individual optical members at the d-line wavelength (587.6 nm); and $v_{d1}$, $v_{d2}$, . . . represent Abbe's numbers of individual optical members at the d-line wavelength (587.6 nm). Also, f denotes the focal length of the entire system.

The configuration of the aspherical surface rotationally symmetrical with respect to the optical axis is defined by the equation already mentioned.

These symbols are also used in the numerical data of the fifth to seventh embodiments to be described later.

Numerical data 4

Image height (length of a half of a diagonal length in an effective imaging area): 3.80 mm
Focal length f: 6.90 mm~19.49 mm
Fno (F-number): 3.50~5.13

| | | | |
|---|---|---|---|
| $r_1 = -52.39$ | $d_1 = 0.84$ | $n_{d1} = 1.81186$ | $v_{d1} = 25.72$ |
| $r_2 = 10.59$ | $d_2 = 1.37$ | | |
| $r_3 = \infty$ | $d_3 = 7.39$ | $n_{d3} = 1.84666$ | $v_{d3} = 23.78$ |
| $r_4 = \infty$ | $d_4 = 0.16$ | | |
| $r_5 = 16.43$ (aspherical surface) | $d_5 = 2.74$ | $n_{d5} = 1.74320$ | $v_{d5} = 49.34$ |
| $r_6 = -14.97$ (aspherical surface) | $d_6 = $ D6 (variable) | | |
| $r_7 = -52.98$ | $d_7 = 0.84$ | $n_{d7} = 1.88300$ | $v_{d7} = 40.76$ |
| $r_8 = 32.48$ | $d_8 = 0.63$ | | |
| $r_9 = -17.46$ | $d_9 = 0.84$ | $n_{d9} = 1.88300$ | $v_{d9} = 40.76$ |
| $r_{10} = 8.037$ | $d_{10} = 2.14$ | $n_{d10} = 1.84666$ | $v_{d10} = 23.78$ |
| $r_{11} = -107.0$ | $d_{11} = $ D11 (variable) | | |
| $r_{12} = \infty$ (stop) | $d_{12} = $ D12 (variable) | | |
| $r_{13} = 7.537$ (aspherical surface) | $d_{13} = 2.20$ | $n_{d13} = 1.74320$ | $v_{d13} = 49.34$ |
| $r_{14} = -32.87$ (aspherical surface) | $d_{14} = 0.21$ | | |
| $r_{15} = 8.885$ | $d_{15} = 2.44$ | $n_{d15} = 1.69584$ | $v_{d15} = 42.98$ |
| $r_{16} = -46.50$ | $d_{16} = 0.84$ | $n_{d16} = 1.84666$ | $v_{d16} = 23.78$ |
| $r_{17} = 4.558$ | $d_{17} = $ D17 (variable) | | |
| $r_{18} = 190.7$ | $d_{18} = 0.84$ | $n_{d18} = 1.84666$ | $v_{d18} = 23.78$ |
| $r_{19} = 24.18$ | $d_{19} = $ D19 (variable) | | |
| $r_{20} = 11.54$ (aspherical surface) | $d_{20} = 2.20$ | $n_{d20} = 1.49700$ | $v_{d20} = 81.54$ |
| $r_{21} = -26.42$ | $d_{21} = 2.33$ | | |
| $r_{22} = \infty$ | $d_{22} = 0.93$ | $n_{d22} = 1.54771$ | $v_{d22} = 62.84$ |
| $r_{23} = \infty$ | $d_{23} = 0.94$ | | |
| $r_{24} = \infty$ | $d_{24} = 0.53$ | $n_{d24} = 1.51633$ | $v_{d24} = 64.14$ |
| $r_{25} = \infty$ | $d_{25} = 0.58$ | | |
| $r_{26} = \infty$ (image plane) | | | |

Aspherical coefficients

| Face No. | k | A4 | A6 | A8 | A10 |
|---|---|---|---|---|---|
| 5 | 0.00 | $-6.27251 \times 10^{-5}$ | $4.81767 \times 10^{-6}$ | $-2.76647 \times 10^{-7}$ | $8.86129 \times 10^{-9}$ |
| 6 | 0.00 | $2.76467 \times 10^{-5}$ | $4.35667 \times 10^{-6}$ | $-2.30756 \times 10^{-7}$ | $7.75216 \times 10^{-9}$ |
| 13 | 0.00 | $-1.48421 \times 10^{-5}$ | $3.02417 \times 10^{-5}$ | $-1.65090 \times 10^{-6}$ | $1.59641 \times 10^{-7}$ |

-continued

Numerical data 4

| | | | | | |
|---|---|---|---|---|---|
| 14 | 0.00 | $4.53970 \times 10^{-4}$ | $4.70445 \times 10^{-5}$ | $-3.48547 \times 10^{-6}$ | $3.17476 \times 10^{-7}$ |
| 20 | 0.00 | $4.00006 \times 10^{-5}$ | $-1.95270 \times 10^{-5}$ | $1.78900 \times 10^{-6}$ | $-6.11181 \times 10^{-8}$ |

Zoom data 4

| Zoom | Wide-angle | Middle | Telephoto |
|---|---|---|---|
| f | 6.903 | 11.534 | 19.49 |
| Fno | 3.50 | 4.19 | 5.13 |
| Angle of view (ω) | 32.476° | 18.478° | 10.930° |
| D6 | 0.63 | 4.64 | 8.15 |
| D11 | 8.49 | 4.54 | 0.95 |
| D12 | 4.55 | 2.57 | 0.42 |
| D17 | 3.43 | 5.62 | 7.44 |
| D19 | 2.74 | 2.47 | 2.97 |

Fifth Embodiment

Figure 11A:
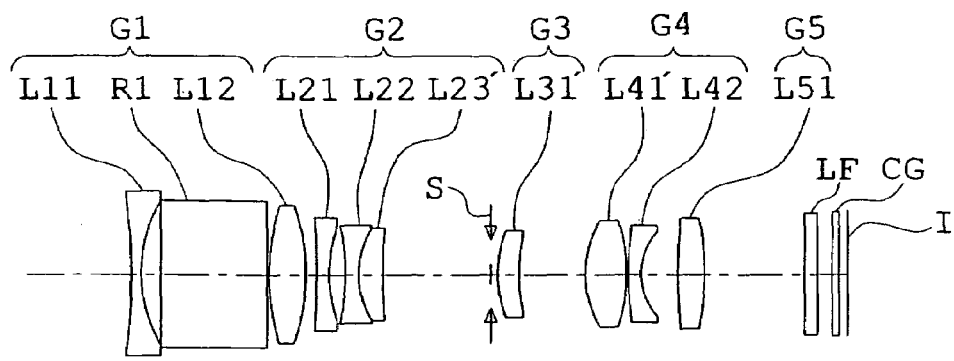
FIGS. 11A, 11B, and 11C are sectional views showing lens arrangements, developed along the optical axis, at wide-angle, middle, and telephoto positions, respectively, of the zoom optical system of a fifth embodiment in the present invention.
Figure 11B:
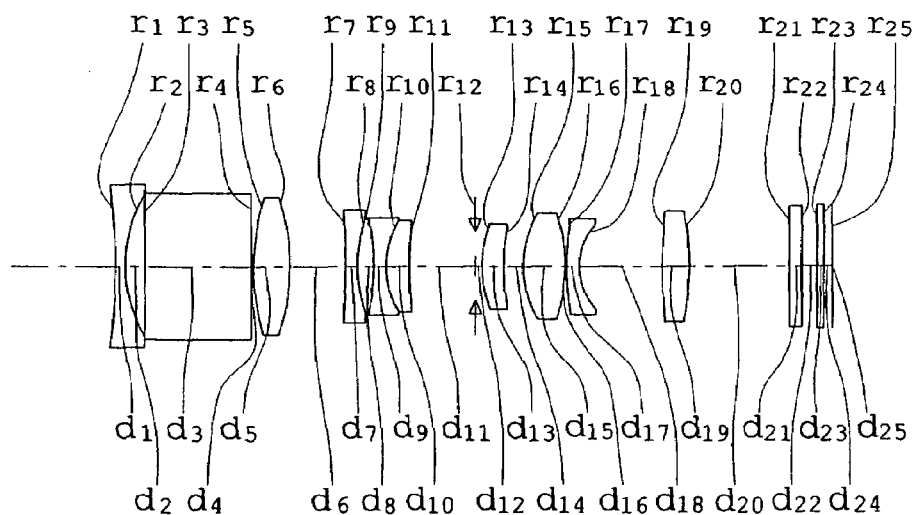
Figure 11C:
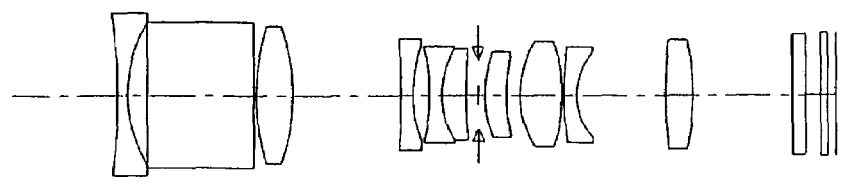

FIGS. 11A-11C show optical arrangements of the fifth embodiment of the zoom optical system used in the electronic imaging apparatus according to the present invention. FIGS. 12A-12R show aberration characteristics, in focusing of an infinite object point, of the zoom optical system in the fifth embodiment.

The zoom optical system of the fifth embodiment, as shown in FIGS. 11A-11C, comprises, in order from the object side, a first lens unit G1, a second lens unit G2, an aperture stop S, a third lens unit G3, a fourth lens unit G4, and a fifth lens unit G5. In FIGS. 11A-11C, again, reference symbol I denotes the imaging surface of an electronic image sensor such as a CCD. Between the zoom optical system and the imaging surface I, the plane-parallel optical low-pass filter LF and the CCD cover glass CG are provided.

The first lens unit G1 includes, in order from the object side, a single biconcave negative lens L11, a reflecting optical element (a reflecting member) R1 for bending the optical path, and a single biconvex positive lens L12, having positive refracting power as a whole.

The second lens unit G2 includes, in order from the object side, a biconcave negative lens L21 and a cemented lens component of a biconcave negative lens L22 and a positive meniscus lens L23' with a convex surface facing the object side, having negative refracting power as a whole.

The third lens unit G3 is constructed with a positive meniscus lens L31' with a convex surface facing the object side, located on the imaging-surface-I side of the second lens unit G2, with the aperture stop S between the second lens unit G2 and the third lens unit G3, and has positive refracting power as a whole.

The fourth lens unit G4 includes a biconvex positive lens L41' and a negative meniscus lens L42 with a convex surface facing the object side, having positive refracting power as a whole.

The fifth lens unit G5 is constructed with a biconvex positive lens L51, having positive refracting power as a whole.

Aspherical surfaces are used for both surfaces of the biconvex positive lens L12 in the first lens unit G1, both surfaces of the positive meniscus lens L31' in the third lens unit G3, and both surfaces of the biconvex positive lens 41' in the fourth lens unit G4.

Upon zooming from the wide-angle position to the telephoto position, the first lens unit G1 is fixed in position, the second lens unit G2 is moved toward the image side at the telephoto position rather than at the wide-angle position, the aperture stop S is fixed in position, the third lens unit G3 is also fixed in position, the fourth lens unit G4 is moved toward the object side at the telephoto position rather than at the wide-angle position, and the fifth lens unit G5 is fixed in position. In this case, spacings between individual lens units are changed so that the spacing $d_6$ between the first lens unit G1 and the second lens unit G2 is widened, the spacing $d_{11}$ between the second lens unit G2 and the stop S is narrowed, a spacing $d_{14}$ between the third lens unit G3 and the fourth lens unit G4 is narrowed, and a spacing $d_{18}$ between the fourth lens unit G4 and the fifth lens unit G5 is widened. Also, the imaging surface I is placed in the direction of the effective imaging diagonal of a CCD or a CMOS sensor.

Subsequently, numerical data of optical members constituting the variable magnification optical system of the fifth embodiment of the present invention are listed below.

Numerical data 5

Image height (length of a half of a diagonal length in an effective imaging area): 3.60 mm
Focal length f: 6.69 mm~18.45 mm
Fno (F-number): 3.50~5.00

| | | | |
|---|---|---|---|
| $r_1 = -33.39$ | $d_1 = 0.80$ | $n_{d1} = 1.80518$ | $v_{d1} = 25.42$ |
| $r_2 = 13.44$ | $d_2 = 1.10$ | | |
| $r_3 = \infty$ | $d_3 = 7.00$ | $n_{d3} = 1.84666$ | $v_{d3} = 23.78$ |
| $r_4 = \infty$ | $d_4 = 0.15$ | | |
| $r_5 = 15.02$ (aspherical surface) | $d_5 = 2.50$ | $n_{d5} = 1.74320$ | $v_{d5} = 49.34$ |
| $r_6 = -12.93$ (aspherical surface) | $d_6 = D6$ (variable) | | |
| $r_7 = -150.6$ | $d_7 = 0.80$ | $n_{d7} = 1.79952$ | $v_{d7} = 42.22$ |

-continued

Numerical data 5

| | | | |
|---|---|---|---|
| $r_8 = 11.76$ | $d_8 = 1.10$ | | |
| $r_9 = -14.94$ | $d_9 = 0.80$ | $n_{d9} = 1.79952$ | $v_{d9} = 42.22$ |
| $r_{10} = 5.843$ | $d_{10} = 1.80$ | | |
| $r_{11} = 54.03$ | $d_{11} = D11$ (variable) | $n_{d11} = 1.84666$ | $v_{d11} = 23.78$ |
| $r_{12} = \infty$ (stop) | $d_{12} = 0.40$ | | |
| $r_{13} = 8.372$ (aspherical surface) | $d_{13} = 1.50$ | $n_{d13} = 1.74320$ | $v_{d13} = 49.34$ |
| $r_{14} = 18.31$ (aspherical surface) | $d_{14} = D14$ (variable) | | |
| $r_{15} = 6.253$ (aspherical surface) | $d_{15} = 2.90$ | $n_{d15} = 1.74320$ | $v_{d15} = 49.34$ |
| $r_{16} = -13.49$ (aspherical surface) | $d_{16} = 0.15$ | | |
| $r_{17} = 55.684$ | $d_{17} = 0.80$ | $n_{d17} = 1.84666$ | $v_{d18} = 23.78$ |
| $r_{18} = 4.296$ | $d_{18} = D18$ (variable) | | |
| $r_{19} = 43.860$ | $d_{19} = 2.00$ | $n_{d19} = 1.49700$ | $v_{d19} = 81.54$ |
| $r_{20} = -15.81$ | $d_{20} = 6.33$ | | |
| $r_{21} = \infty$ | $d_{21} = 0.88$ | $n_{d21} = 1.54771$ | $v_{d21} = 62.84$ |
| $r_{22} = \infty$ | $d_{22} = 0.89$ | | |
| $r_{23} = \infty$ | $d_{23} = 0.50$ | $n_{d24} = 1.51633$ | $v_{d24} = 64.14$ |
| $r_{24} = \infty$ | $d_{24} = 0.56$ | | |
| $r_{25} = \infty$ (image plane) | | | |

Aspherical coefficients

| Face No. | k | A4 | A6 | A8 | A10 |
|---|---|---|---|---|---|
| 5 | 0.00 | $-8.75679 \times 10^{-5}$ | $-3.28931 \times 10^{-6}$ | $2.81096 \times 10^{-7}$ | $-1.53034 \times 10^{-9}$ |
| 6 | 0.00 | $8.86390 \times 10^{-5}$ | $6.60148 \times 10^{-8}$ | $5.41252 \times 10^{-8}$ | $-9.60653 \times 10^{-9}$ |
| 13 | 0.00 | $6.57110 \times 10^{-4}$ | $-1.96290 \times 10^{-5}$ | $7.68643 \times 10^{-6}$ | $-5.19184 \times 10^{-7}$ |
| 14 | 0.00 | $1.08296 \times 10^{-3}$ | $-3.88758 \times 10^{-5}$ | $1.60807 \times 10^{-5}$ | $-1.20522 \times 10^{-6}$ |
| 15 | 0.00 | $5.69022 \times 10^{-4}$ | $-2.13312 \times 10^{-5}$ | $1.33198 \times 10^{-6}$ | $-9.45570 \times 10^{-8}$ |
| 16 | 0.00 | $3.09325 \times 10^{-4}$ | $-5.18559 \times 10^{-5}$ | $-2.09692 \times 10^{-8}$ | $-6.64648 \times 10^{-8}$ |

Zoom data 5

| Zoom | Wide-angle | Middle | Telephoto |
|---|---|---|---|
| f | 6.688 | 10.940 | 18.452 |
| Fno | 3.50 | 4.18 | 5.00 |
| Angle of view (ω) | 30.355° | 18.192° | 10.655° |
| D6 | 0.60 | 3.53 | 7.08 |
| D11 | 7.39 | 4.50 | 0.90 |
| D14 | 4.58 | 1.46 | 0.90 |
| D18 | 2.50 | 5.60 | 6.21 |

Sixth Embodiment

Figure 13A:
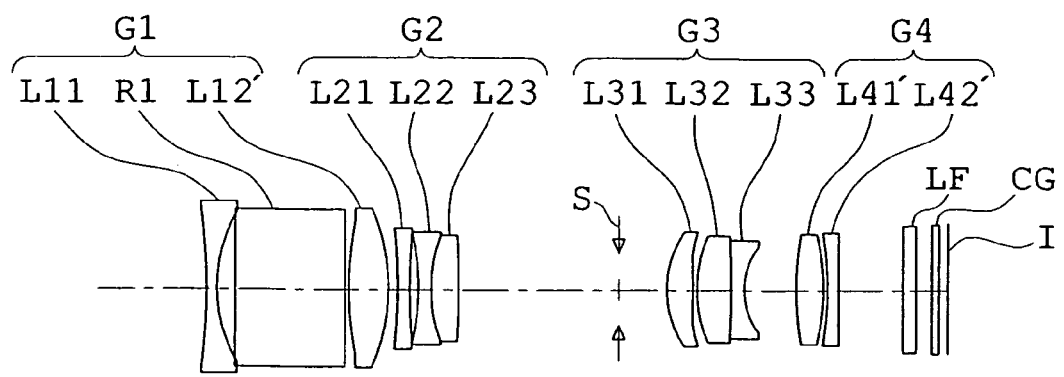
FIGS. 13A, 13B, and 13C are sectional views showing lens arrangements, developed along the optical axis, at wide-angle, middle, and telephoto positions, respectively, of the zoom optical system of a sixth embodiment in the present invention.
Figure 13B:
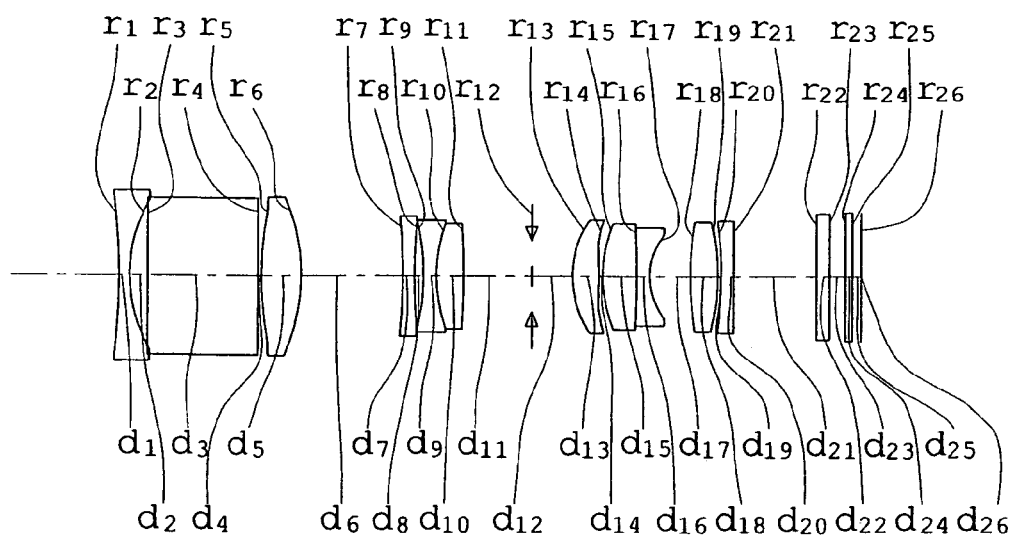
Figure 13C:
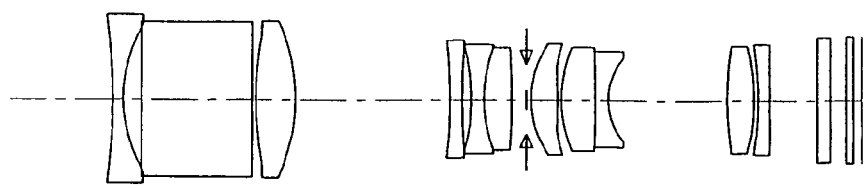

FIGS. 13A-13C show optical arrangements of the sixth embodiment of the zoom optical system used in the electronic imaging apparatus according to the present invention. FIGS. 14A-14R show aberration characteristics, in focusing of an infinite object point, of the zoom optical system in the sixth embodiment.

The zoom optical system of the sixth embodiment, as shown in FIGS. 13A-13C, comprises, in order from the object side, a first lens unit G1, a second lens unit G2, an aperture stop S, a third lens unit G3, and a fourth lens unit G4. In FIGS. 13A-13C, again, reference symbol I denotes the imaging surface of an electronic image sensor such as a CCD. Between the zoom optical system and the imaging surface I, the plane-parallel optical low-pass filter LF and the CCD cover glass CG are provided.

The first lens unit G1 includes, in order from the object side, a single biconcave negative lens L11, a reflecting optical element (a reflecting member) R1 for bending the optical path, and a positive lens L12' configured into a biconvex shape in the proximity of the optical axis (at the lens center), having positive refracting power as a whole.

The second lens unit G2 includes, in order from the object side, a biconcave negative lens L21 and a cemented lens component of a biconcave negative lens L22 and a biconvex positive lens L23, having negative refracting power as a whole.

The third lens unit 63 includes a positive lens L31 configured into a biconvex shape in the proximity of the optical axis (at the lens center), located on the imaging-surface-I side of the second lens unit G2, with the aperture stop S between the second lens unit G2 and the third lens unit G3, and a cemented lens component of a biconvex positive lens L32 and a biconcave negative lens L33, having positive refracting power as a whole.

The fourth lens unit G4 includes a biconvex positive lens L41' and a negative meniscus lens L42' with a concave surface facing the object side, having positive refracting power as a whole.

Aspherical surfaces are used for both surfaces of the positive lens L12' in the first lens unit G1, both surfaces of the positive lens L31 in the third lens unit G3, and both surfaces of the biconvex positive lens 41' in the fourth lens unit G4.

The positive lens L12' of the first lens unit G1 and the positive lens L31 of the third lens unit G3 are configured so that the negative power increases progressively in going from the lens center to the periphery.

Upon zooming from the wide-angle position to the telephoto position, the first lens unit G1 is fixed in position, the second lens unit G2 is moved toward the image side at the telephoto position rather than at the wide-angle position, the aperture stop S is fixed in position, the third lens unit G3 is moved toward the object side at the telephoto position rather than at the wide-angle position, and the fourth lens unit G4 is moved along a locus that is concave toward the image side. In this case, spacings between individual lens units are changed so that the spacing $d_6$ between the first lens unit G1 and the second lens unit G2 is widened, the spacings $d_{11}$ and $d_{12}$ between the second lens unit G2 and the third lens unit G3 are narrowed, the spacing $d_{17}$ between the third lens unit G3 and the fourth lens unit G4 is narrowed in the range from the wide-angle position to the middle position and is widened in the range of the middle position to the telephoto position, and a spacing $d_{21}$ between the fourth lens unit G4 and the plane-parallel plate FL is widened in the range from the wide-angle position to the middle position and is narrowed in the range from the middle position to the telephoto position. Also, the imaging surface I is placed in the direction of the effective imaging diagonal of a CCD or a CMOS sensor.

Subsequently, numerical data of optical members constituting the variable magnification optical system of the sixth embodiment of the present invention are listed below.

Numerical data 6

Image height (length of a half of a diagonal length in an effective imaging area): 3.60 mm
Focal length f: 6.49 mm~18.47 mm
Fno (F-number): 3.60~5.10

| | | | |
|---|---|---|---|
| $r_1 = -71.23$ | $d_1 = 0.80$ | $n_{d1} = 1.83988$ | $v_{d1} = 26.17$ |
| $r_2 = 10.20$ | $d_2 = 1.20$ | | |
| $r_3 = \infty$ | $d_3 = 7.00$ | $n_{d3} = 1.84666$ | $v_{d3} = 23.78$ |
| $r_4 = \infty$ | $d_4 = 0.15$ | | |
| $r_5 = 16.36$ (aspherical surface) | $d_5 = 2.70$ | $n_{d5} = 1.74320$ | $v_{d5} = 49.34$ |
| $r_6 = -14.68$ (aspherical surface) | $d_6 = D6$ (variable) | | |
| $r_7 = -41.38$ | $d_7 = 0.80$ | $n_{d7} = 1.88300$ | $v_{d7} = 40.76$ |
| $r_8 = 34.67$ | $d_8 = 0.60$ | | |
| $r_9 = -18.02$ | $d_9 = 0.80$ | $n_{d9} = 1.90091$ | $v_{d9} = 40.09$ |
| $r_{10} = 8.556$ | $d_{10} = 1.80$ | | |
| $r_{11} = -56.53$ | $d_{11} = D11$ (variable) | $n_{d11} = 1.84666$ | $v_{d11} = 23.78$ |
| $r_{12} = \infty$ (stop) | $d_{12} = D12$ (variable) | | |
| $r_{13} = 7.204$ (aspherical surface) | $d_{13} = 1.80$ | $n_{d13} = 1.74320$ | $v_{d13} = 49.34$ |
| $r_{14} = -81.23$ (aspherical surface) | $d_{14} = 0.20$ | | |
| $r_{15} = 8.559$ | $d_{15} = 2.30$ | $n_{d15} = 1.73804$ | $v_{d15} = 40.33$ |
| $r_{16} = -38.55$ | $d_{16} = 0.80$ | | |
| $r_{17} = 4.667$ | $d_{17} = D17$ (variable) | $n_{d17} = 1.84666$ | $v_{d17} = 23.78$ |
| $r_{18} = 18.26$ (aspherical surface) | $d_{18} = 1.80$ | $n_{d18} = 1.46968$ | $v_{d18} = 79.60$ |
| $r_{19} = -14.91$ (aspherical surface) | $d19 = 0.20$ | | |
| $r_{20} = -24.77$ | $d_{20} = 0.80$ | $n_{d20} = 1.84666$ | $v_{d20} = 23.78$ |
| $r_{21} = -947.4$ | $d_{21} = D21$ (variable) | | |
| $r_{22} = \infty$ | $d_{22} = 0.88$ | $n_{d22} = 1.54771$ | $v_{d22} = 62.84$ |
| $r_{23} = \infty$ | $d_{23} = 0.89$ | | |
| $r_{24} = \infty$ | $d_{24} = 0.50$ | $n_{d24} = 1.51633$ | $v_{d24} = 64.14$ |
| $r_{25} = \infty$ | $d_{25} = 0.52$ | | |
| $r_{26} = \infty$ (image plane) | | | |

Aspherical coefficients

| Face No. | k | A4 | A6 | A8 | A10 |
|---|---|---|---|---|---|
| 5 | 0.00 | $-2.01853 \times 10^{-4}$ | $2.01458 \times 10^{-6}$ | $2.17879 \times 10^{-8}$ | $-1.00734 \times 10^{-8}$ |
| 6 | 0.00 | $-1.10982 \times 10^{-4}$ | $3.01286 \times 10^{-6}$ | $-8.52575 \times 10^{-8}$ | $-6.02335 \times 10^{-9}$ |
| 13 | 0.00 | $2.06138 \times 10^{-4}$ | $4.30326 \times 10^{-5}$ | $1.92948 \times 10^{-8}$ | $1.96534 \times 10^{-7}$ |
| 14 | 0.00 | $6.74285 \times 10^{-4}$ | $7.43242 \times 10^{-5}$ | $-2.73629 \times 10^{-6}$ | $4.90486 \times 10^{-7}$ |
| 18 | 0.00 | $6.23611 \times 10^{-5}$ | $5.72091 \times 10^{-5}$ | $7.72127 \times 10^{-7}$ | $-3.84119 \times 10^{-7}$ |
| 19 | 0.00 | $4.98499 \times 10^{-6}$ | $9.35779 \times 10^{-5}$ | $1.94066 \times 10^{-8}$ | $-3.80890 \times 10^{-7}$ |

Zoom data 6

| Zoom | Wide-angle | Middle | Telephoto |
|---|---|---|---|
| f | 6.487 | 10.971 | 18.47 |
| Fno | 3.60 | 4.22 | 5.10 |
| Angle of view (ω) | 32.710° | 18.296° | 10.883° |
| D6 | 0.60 | 6.52 | 9.85 |
| D11 | 10.14 | 4.20 | 0.90 |
| D12 | 3.28 | 2.94 | 0.40 |
| D17 | 3.54 | 2.69 | 7.83 |
| D21 | 4.02 | 5.25 | 2.70 |

Seventh Embodiment

Figure 15A:
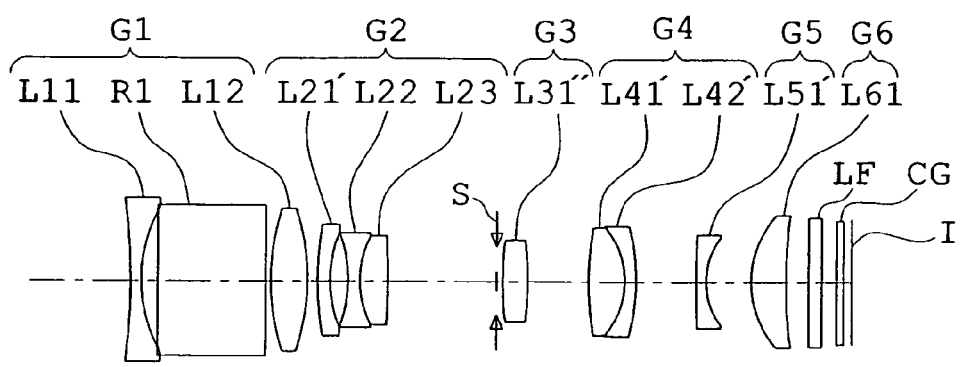
FIGS. 15A, 15B, and 15C are sectional views showing lens arrangements, developed along the optical axis, at wide-angle, middle, and telephoto positions, respectively, of the zoom optical system of a seventh embodiment in the present invention.
Figure 15B:
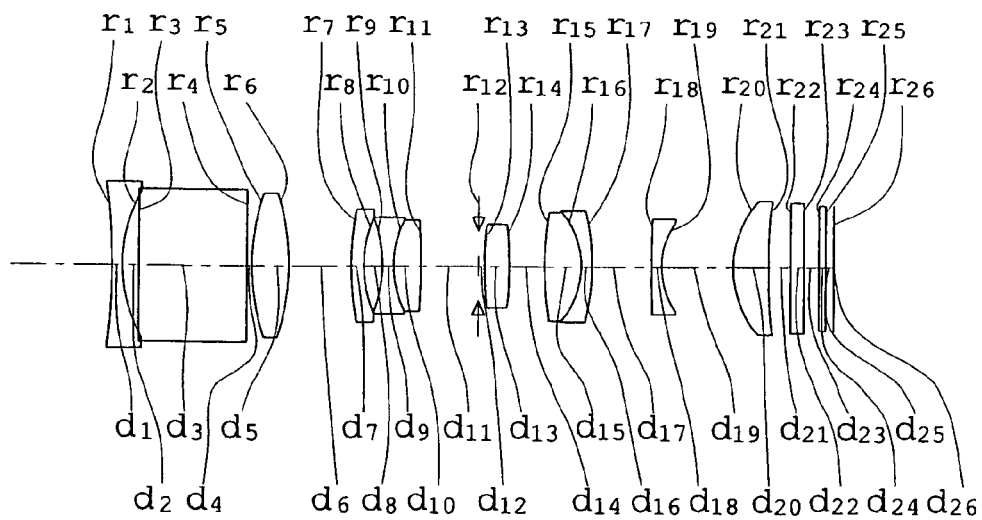
Figure 15C:
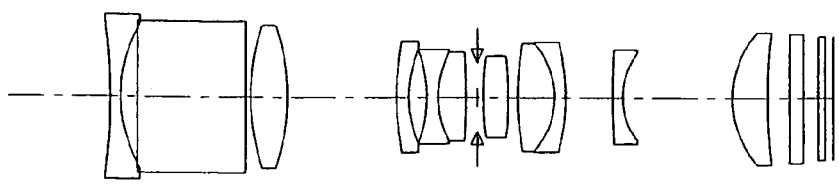

FIGS. 15A-15C show optical arrangements of the seventh embodiment of the zoom optical system used in the electronic imaging apparatus according to the present invention. FIGS.

16A-16R show aberration characteristics, in focusing of an infinite object point, of the zoom optical system in the seventh embodiment.

The zoom optical system of the seventh embodiment, as shown in FIGS. 15A-15C, comprises, in order from the object side, a first lens unit G1, a second lens unit G2, an aperture stop S, a third lens unit G3, a fourth lens unit G4, a fifth lens unit G5, and a sixth lens unit G6. In FIGS. 15A-15C, again, reference symbol I denotes the imaging surface of an electronic image sensor such as a CCD. Between the zoom optical system and the imaging surface I, the plane-parallel optical low-pass filter LF and the CCD cover glass CG are provided.

The first lens unit G1 includes, in order from the object side, a single biconcave negative lens L11, a reflecting optical element (a reflecting member) R1 for bending the optical path, and a single biconvex positive lens L12, having positive refracting power as a whole.

The second lens unit G2 includes, in order from the object side, a negative meniscus lens L21' with a concave surface facing the image side and a cemented lens component of a biconcave negative lens L22 and a biconvex positive lens L23, having negative refracting power as a whole.

The third lens unit G3 is constructed with a biconvex positive lens L31" located on the imaging-surface-I side of the second lens unit G2, with the aperture stop S between the second lens unit G2 and the third lens unit G3, having positive refracting power as a whole.

The fourth lens unit G4 includes a biconvex positive lens L41' and a negative meniscus lens L42' with a concave surface facing the object side, having positive refracting power as a whole.

The fifth lens unit G5 is constructed with a negative meniscus lens L51' with a concave surface facing the image side, having negative refracting power as a whole.

The sixth lens unit G6 is constructed with a positive meniscus lens L61 with a convex surface facing the object side, having positive refracting power as a whole.

Aspherical surfaces are used for both surfaces of the biconvex positive lens L12 in the first lens unit G1, both surfaces of the biconvex positive lens L31" in the third lens unit G3, and the object-side surface of the biconvex positive lens 41' in the fourth lens unit G4.

Upon zooming from the wide-angle position to the telephoto position, the first lens unit G1 is fixed in position, the second lens unit G2 is moved toward the image side at the telephoto position rather than at the wide-angle position, the aperture stop S is fixed in position, the third lens unit G3 is also fixed in position, the fourth lens unit G4 is moved toward the object side at the telephoto position rather than at the wide-angle position, the fifth lens unit G5 is moved toward the object side at the telephoto position rather than at the wide-angle position, and the sixth lens unit G6 is fixed in position. In this case, spacings between individual lens units are changed so that the spacing $d_6$ between the first lens unit G1 and the second lens unit G2 is widened, the spacing $d_{11}$ between the second lens unit G2 and the stop S is narrowed, the spacing $d_{14}$ between the third lens unit G3 and the fourth lens unit G4 is narrowed, the spacing $d_{17}$ between the fourth lens unit G4 and the fifth lens unit G5 is narrowed, and a spacing $d_{19}$ between the fifth lens unit G5 and the sixth lens unit G6 is widened. Also, the imaging surface I is placed in the direction of the effective imaging diagonal of a CCD or a CMOS sensor.

Subsequently, numerical data of optical members constituting the variable magnification optical system of the seventh embodiment of the present invention are listed below.

Numerical data 7

Image height (length of a half of a diagonal length in an effective imaging area): 3.60 mm
Focal length f: 6.45 mm~18.62 mm
Fno (F-number): 3.50~5.00

| | | | |
|---|---|---|---|
| $r_1 = -64.65$ | $d_1 = 0.80$ | $n_{d1} = 1.80518$ | $v_{d1} = 25.42$ |
| $r_2 = 10.22$ | $d_2 = 1.20$ | | |
| $r_3 = \infty$ | $d_3 = 7.00$ | $n_{d3} = 1.84666$ | $v_{d3} = 23.78$ |
| $r_4 = \infty$ | $d_4 = 0.15$ | | |
| $r_5 = 12.96$ (aspherical surface) | $d_5 = 2.50$ | $n_{d5} = 1.74320$ | $v_{d5} = 49.34$ |
| $r_6 = -13.90$ (aspherical surface) | $d_6 = D6$ (variable) | | |
| $r_7 = 21.63$ | $d_7 = 0.80$ | $n_{d7} = 1.79952$ | $v_{d7} = 42.22$ |
| $r_8 = 8.619$ | $d_8 = 1.20$ | | |
| $r_9 = -9.218$ | $d_9 = 0.80$ | $n_{d9} = 1.80610$ | $v_{d9} = 40.92$ |
| $r_{10} = 6.493$ | $d_{10} = 1.80$ | $n_{d10} = 1.84666$ | $v_{d10} = 23.78$ |
| $r_{11} = -169.6$ | $d_{11} = D11$ (variable) | | |
| $r_{12} = \infty$ (stop) | $d_{12} = 0.40$ | | |
| $r_{13} = 16.83$ (aspherical surface) | $d_{13} = 1.50$ | $n_{d13} = 1.76802$ | $v_{d13} = 49.24$ |
| $r_{14} = -189.4$ (aspherical surface) | $d_{14} = D14$ (variable) | | |
| $r_{15} = 13.76$ (aspherical surface) | $d_{15} = 2.50$ | $n_{d15} = 1.74320$ | $v_{d15} = 49.34$ |
| $r_{16} = -5.453$ | $d_{16} = 0.80$ | $n_{d16} = 1.84666$ | $v_{d16} = 23.78$ |
| $r_{17} = -13.50$ | $d_{17} = D17$ (variable) | | |
| $r_{18} = 40.32$ | $d_{18} = 0.70$ | $n_{d18} = 1.80100$ | $v_{d18} = 34.97$ |
| $r_{19} = 5.700$ | $d_{19} = D19$ (variable) | | |
| $r_{20} = 7.537$ | $d_{20} = 2.30$ | $n_{d20} = 1.49700$ | $v_{d20} = 81.54$ |
| $r_{21} = -24967.7$ | $d_{21} = 1.20$ | | |
| $r_{22} = \infty$ | $d_{22} = 0.88$ | $n_{d22} = 1.54771$ | $v_{d22} = 62.84$ |
| $r_{23} = \infty$ | $d_{23} = 0.89$ | | |

-continued

Numerical data 7

| | | |
|---|---|---|
| $r_{24} = \infty$ | $d_{24} = 0.50$ | $n_{d24} = 1.51633$  $v_{d24} = 64.14$ |
| $r_{25} = \infty$ | $d_{25} = 0.60$ | |
| $r_{26} = \infty$ (image plane) | | |

Aspherical coefficients

| Face No. | k | A4 | A6 | A8 | A10 |
|---|---|---|---|---|---|
| 5 | 0.00 | $-1.42787 \times 10^{-4}$ | $5.20969 \times 10^{-6}$ | $-2.70467 \times 10^{-7}$ | $7.69228 \times 10^{-9}$ |
| 6 | 0.00 | $4.66210 \times 10^{-5}$ | $5.40371 \times 10^{-6}$ | $-2.77354 \times 10^{-7}$ | $7.90983 \times 10^{-9}$ |
| 13 | 0.00 | $8.06284 \times 10^{-5}$ | $-1.54500 \times 10^{-4}$ | $2.72105 \times 10^{-5}$ | $-1.72771 \times 10^{-6}$ |
| 14 | 0.00 | $1.67854 \times 10^{-4}$ | $-1.65114 \times 10^{-4}$ | $2.81941 \times 10^{-5}$ | $-1.73858 \times 10^{-6}$ |
| 15 | 0.00 | $-1.43067 \times 10^{-4}$ | $-2.86767 \times 10^{-5}$ | $4.50634 \times 10^{-6}$ | $-2.10252 \times 10^{-7}$ |

Zoom data 7

| Zoom | Wide-angle | Middle | Telephoto |
|---|---|---|---|
| f | 6.450 | 10.94 | 18.62 |
| Fno | 3.50 | 3.80 | 5.00 |
| Angle of view ($\omega$) | 31.805° | 18.161° | 10.697° |
| D6 | 0.60 | 4.11 | 7.41 |
| D11 | 7.70 | 4.15 | 0.90 |
| D14 | 4.28 | 2.54 | 0.90 |
| D17 | 3.97 | 3.93 | 3.09 |
| D19 | 2.98 | 4.75 | 7.23 |

In the fourth to seventh embodiments, for example, a path-bending prism is favorably used as the reflecting optical system (the reflecting member) R1.

Next, values corresponding to conditions in the fourth to seventh embodiments are shown in Table 2.

TABLE 2

| | 4th embodiment | 5th embodiment | 6th embodiment | 7th embodiment |
|---|---|---|---|---|
| fw | 6.903 | 6.688 | 6.487 | 6.450 |
| $y_{07}$ | 2.66 | 2.52 | 2.52 | 2.52 |
| $y_{10}$ | 3.8 | 3.6 | 3.6 | 3.6 |
| tan $\omega_{07w}$ | −0.4133 | −0.3934 | −0.4184 | −0.4133 |
| tan $\omega_{10w}$ | −0.6365 | −0.5856 | −0.6422 | −0.6202 |
| $|y_{07}/(fw \cdot \tan \omega_{07w})|$ | 0.932 | 0.958 | 0.929 | 0.945 |
| $|y_{10}/(fw \cdot \tan \omega_{10w})|$ | 0.865 | 0.919 | 0.864 | 0.900 |
| $|y_{07}/(fw \cdot \tan \omega_{07w})| - |y_{10}/(fw \cdot \tan \omega_{10w})|$ | 0.068 | 0.039 | 0.064 | 0.045 |
| R11 | −52.3936 | −33.3902 | −71.2300 | −64.6486 |
| R12 | 10.5942 | 13.4398 | 10.1969 | 10.2172 |
| (R11 + R12)/(R11 − R12) | 0.664 | 0.426 | 0.750 | 0.727 |
| $n_{dA1}$ | 1.81186 | 1.80518 | 1.83988 | 1.80518 |
| $f_1$ | −10.790 | −11.811 | −10.573 | −10.906 |
| $f_1/fw$ | −1.563 | −1.766 | −1.630 | −1.691 |

The electronic imaging apparatus using the zoom optical system of the present invention such as that mentioned above can be used in the photographing apparatus in which the image of the object is formed by the imaging optical system, such as a zoom optical system, and is received by the image sensor, such as a CCD, to photograph, notably in a digital camera or a video camera, a personal computer which is an example of an information processing apparatus, or a telephone, especially a mobile phone that is handy to carry. The embodiments of such apparatuses are shown below.

Figure 17:
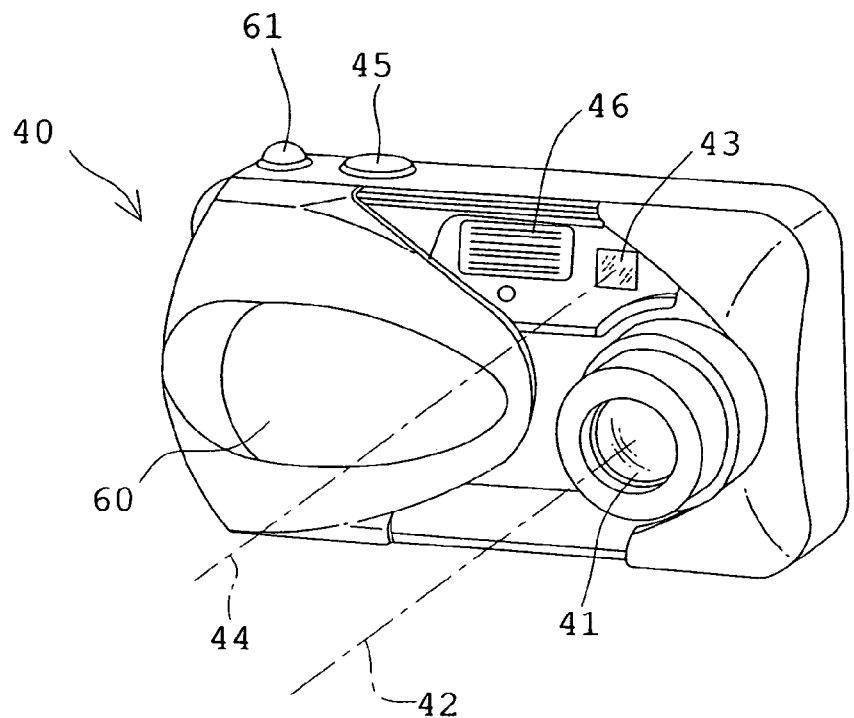
FIG. 17 is a perspective front view showing the appearance of an example of a collapsible digital camera incorporating the zoom optical system according to the present invention.
Figure 18:
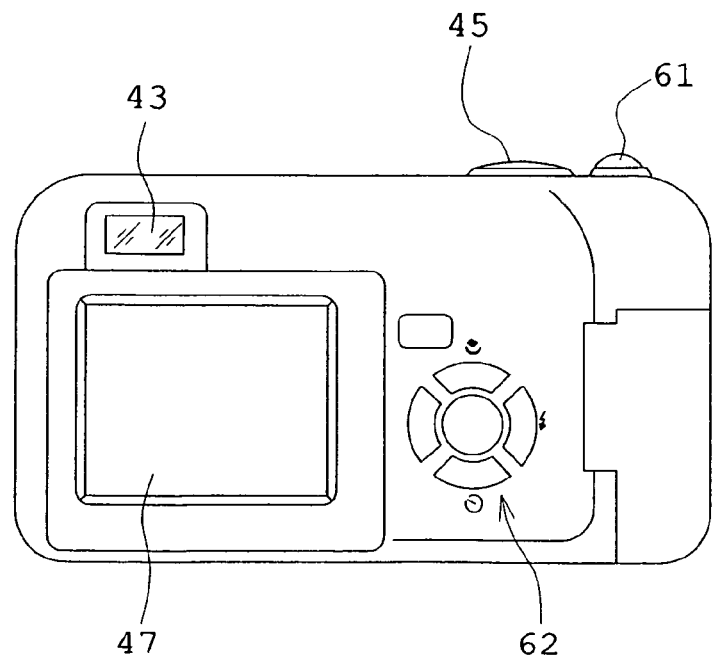
FIG. 18 is a perspective rear view showing the digital camera of FIG. 17.
Figure 19:
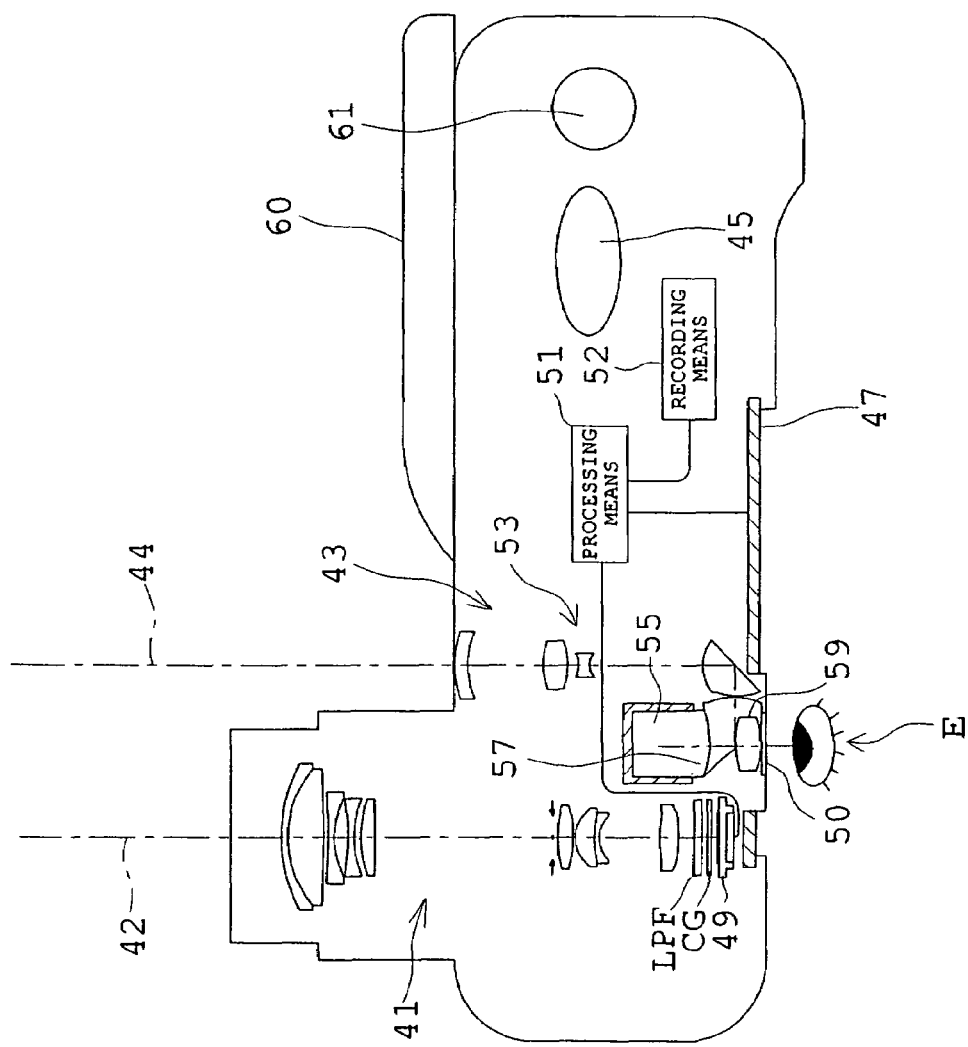
FIG. 19 is an opened-up view showing schematically the structure of the digital camera of FIG. 17.

FIGS. 17-19 show a collapsible digital camera 40 incorporating the zoom optical system of the present invention in a photographing optical system 41. In FIGS. 17 and 19, a state where the photographing optical system 41 is not collapsed is shown.

The digital camera 40, in this example, includes the photographing optical system 41 having a photographing optical path 42, a finder optical system 43 having a finder optical path 44, a shutter button 45, a flash lamp 46, a liquid crystal display monitor 47, a focal-length changing button 61, and a setting changing switch 62. When the photographing optical system 41 is collapsed, a cover 60 is slid and thereby the photographing optical system 41, the finder optical system 43, and the flash lamp 46 are covered by the cover 60. When the cover 60 is opened and the camera 40 is set to a photographic mode, the photographing optical system 41 becomes a non-collapsible state of FIG. 19. When the shutter button 45 provided on the upper face of the camera 40 is pushed, photographing is performed, in association with this shutter operation, through the photographing optical system 41, for example, the zoom lens of the first embodiment.

An object image produced by the photographing optical system 41 is formed on the imaging surface of the CCD 49 through the low-pass filter LF applying an IR cutoff coat and the cover glass CG. The object image received by the CCD 49 is displayed as an electronic image on the liquid crystal display monitor 47 provided on the back face of the camera, through a processing means 51. A recording means 52 is connected to this processing means 51 so that a photographed electronic image can also be recorded. Also, the recording means 52 may be provided to be independent of the processing means 51, or may be constructed so that the image is electronically recorded and written by a floppy disk, memory card, or MO.

Further, a finder objective optical system 53 is located on the finder optical path 44. The finder objective optical system 53 includes a plurality of lens units (three lens units in the case of the figure) and two prisms and is a zoom optical system that the focal length is changed in association with the operation of the zoom lens of the photographing optical system 41. The object image produced by the finder objective optical system 53 is formed on a field frame 57 of an erecting prism 55 that is an image erecting member. Behind the erecting prism 55 is located an eyepiece optical system 59 which introduces the erect image into an observer's eye E. Also, a cover member 50 is provided on the exit side of the eyepiece optical system 59.

In the digital camera 40 constructed as mentioned above, the photographing optical system 41 is high in performance, small in size, and collapsible. Thus, high performance and low cost can be attained.

Figure 20:
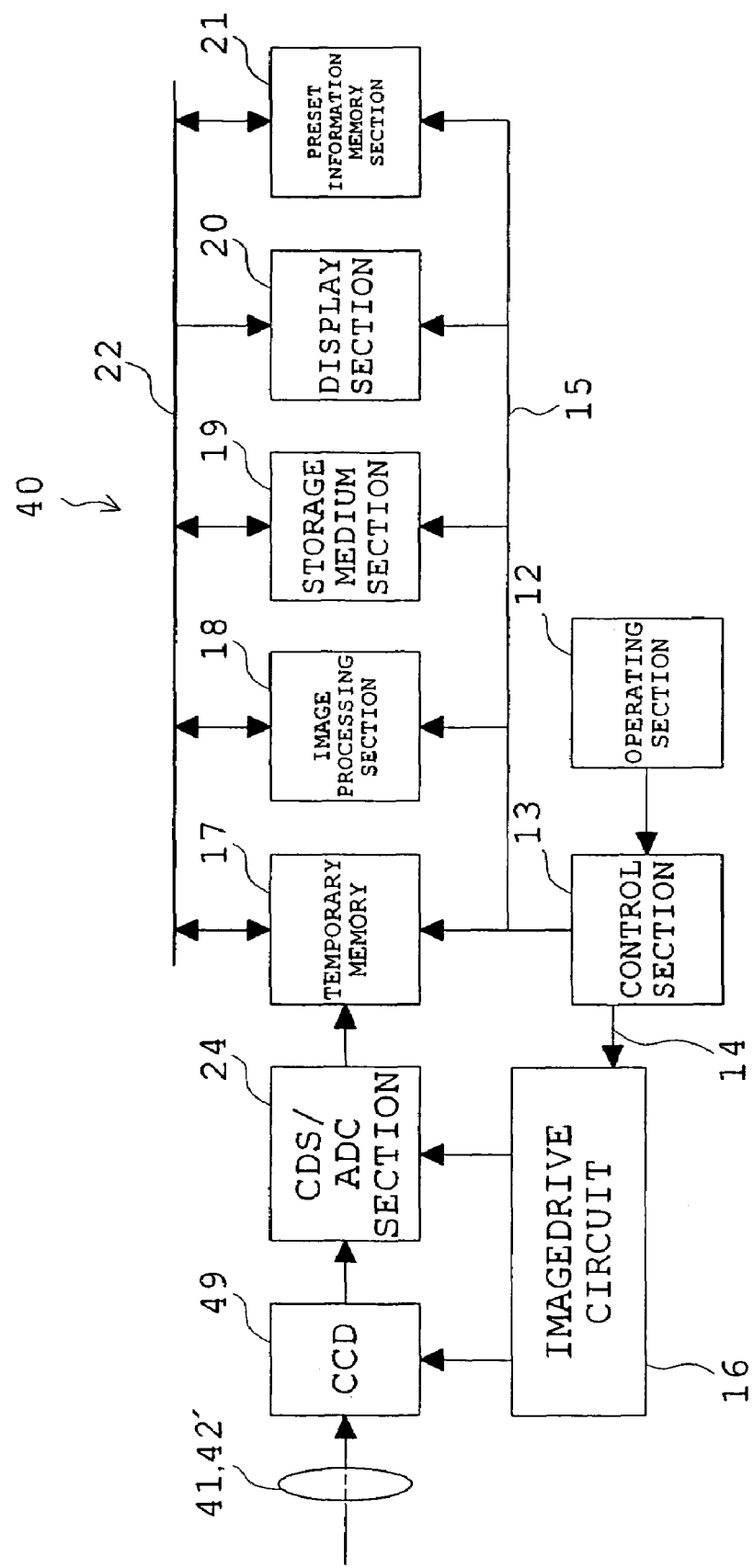
FIG. 20 is a block diagram showing the configuration of an internal circuit of essential parts of the digital camera of FIG. 17.

FIG. 20 shows the configuration of the internal circuit of essential sections of the digital camera 40. In the following description, the processing means 51 includes, for example, a CDS/ADC section 24, a temporary memory 17, and an image processing section 18, and the recording means 52 includes, for example, a storage medium section 19.

The digital camera 40, as shown in FIG. 20, has an operating section 12; a control section 13 connected to the operating section 12; and an image drive circuit 16, the temporary memory 17, the image processing section 18, the storage medium section 19, a display section 20, and a preset information memory section 21, connected to control signal output ports of the control section 13 through busses 14 and 15.

The temporary memory 17, the image processing section 18, the storage medium section 19, the display section 20, and the preset information memory section 21 are constructed so that data can be mutually input or output through a bus 22. A CCD 49 and the CDS/ADC section 24 are connected to the image drive circuit 16.

The operating section 12 is a circuit provided with various input buttons and switches and transmitting event information input from the exterior (a camera user) through these input buttons and switches to the control section 13. The control section 13 is a circuit that is a central arithmetical processing unit including, for example, a CPU, and incorporates a program memory, not shown, to control the whole of the digital camera 40 by receiving instructions input from the camera user through the operating section 12 in accordance with a program housed in the program memory.

The CCD 49 receives the object image formed through the photographing optical system 41 according to the present invention. The CCD 49 is an image sensor that is drive-controlled by the image drive circuit 16 and converts the amount of light of each pixel of the object image into an electric signal to output the signal to the CDS/ADC section 24.

The CDS/ADC section 24 is a circuit that amplifies the electric signal input from the CCD 49 and carries out an analog/digital conversion to output image raw data (Bayer data, hereinafter called RAW data) according to only such amplification and digital conversion to the temporary memory 17.

The temporary memory 17 is a memory device that is a buffer including, for example, SDRAM and temporarily stores the RAW data output from the CDS/ADC section 24.

The image processing section 18 is a circuit that reads out the RAW data stored in the temporary memory 17 or the storage medium section 19 to electrically process various images, together with correction for distortion, in accordance with image-quality parameters designated by the control section 13.

The storage medium section 19 is a control circuit of a device that removably mounts a card or stick recording medium including, for example, a flash memory and records and holds the RAW data transferred from the temporary memory 17 and image data processed by the image processing section 18 in the card or stick flash memory.

The display section 20 is a circuit that is provided with the liquid crystal display monitor 47 to display an image and an operation menu on the liquid crystal display monitor 47. The preset information memory section 21 is provided with a ROM previously incorporating various image-quality parameters and a RAM storing an image-quality parameter selected by the input operation of the operating section 12 from among image-quality parameters read out from the ROM. The preset information memory section 21 is a circuit for controlling the input into and output from to these memories.

Figure 21:
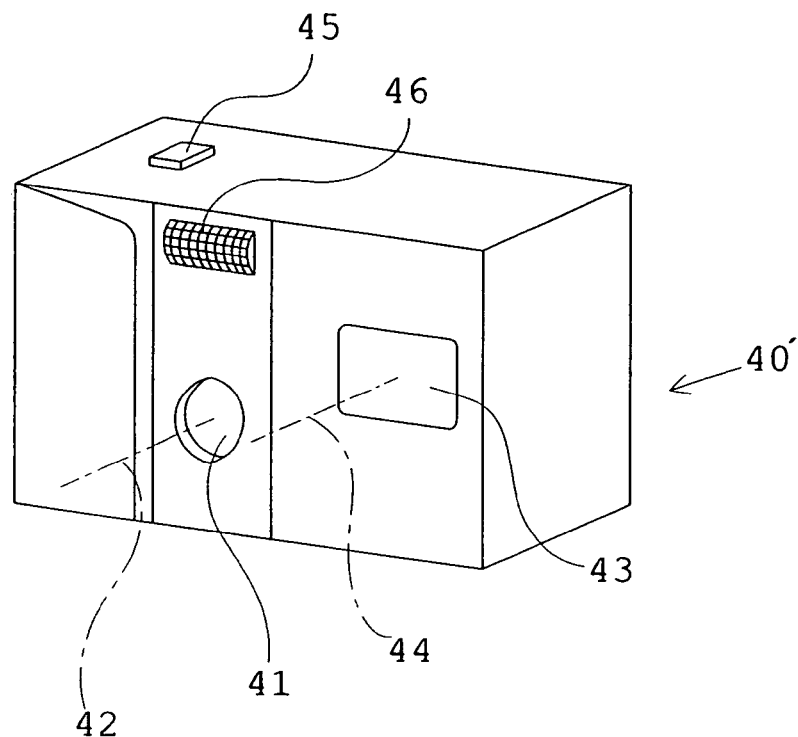
FIG. 21 is a perspective front view showing the appearance of a digital camera applying the optical system of the present invention.
Figure 22:
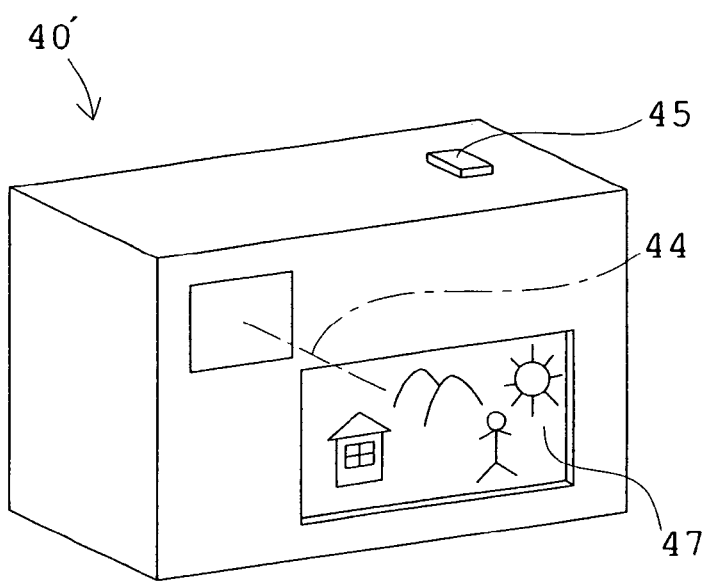
FIG. 22 is a perspective rear view showing the digital camera of FIG. 21.
Figure 23:
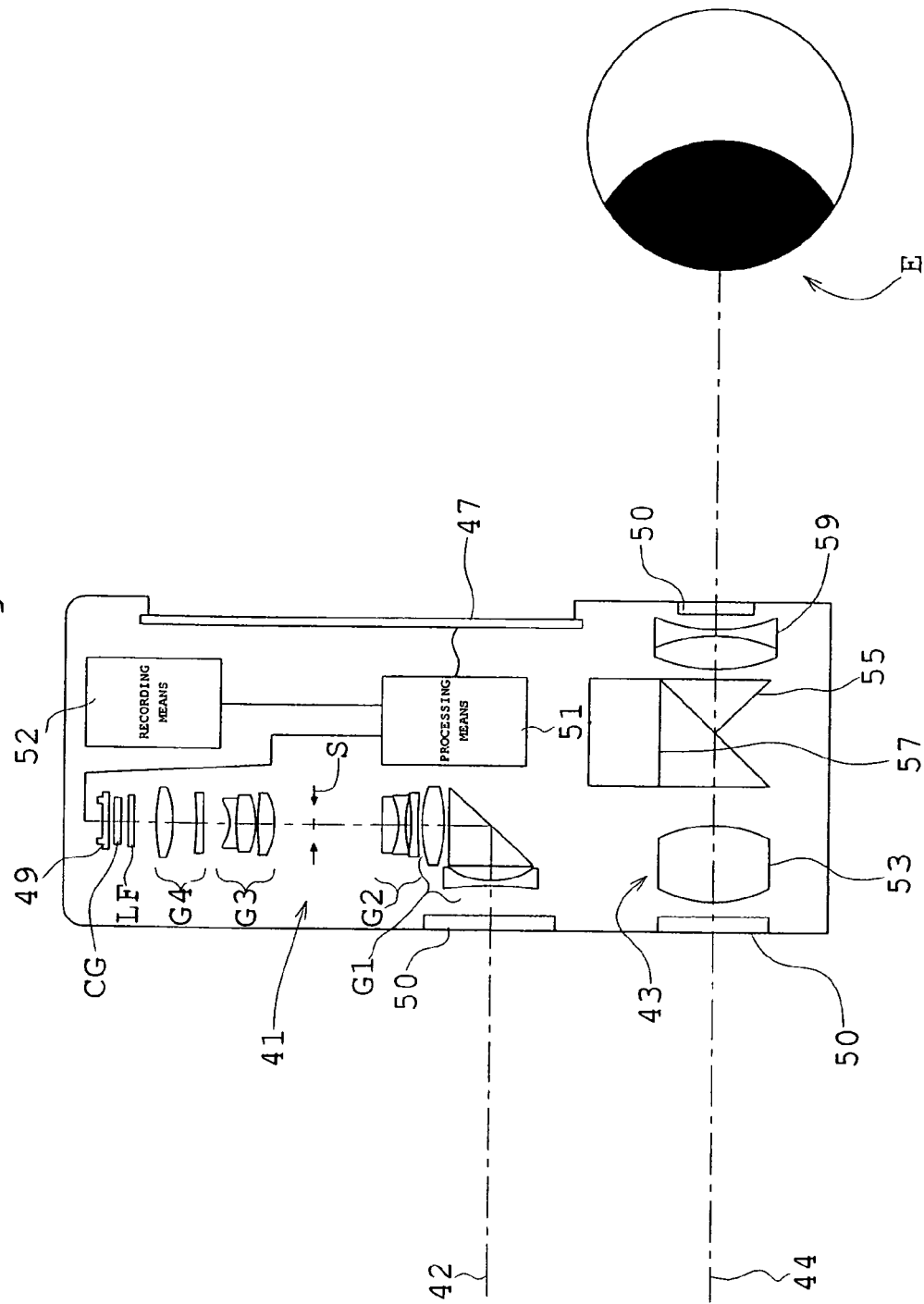
FIG. 23 is a sectional view showing the structure of the digital camera of FIG. 21.

FIGS. 21-23 show a digital camera 40' in which the path-bending zoom optical system according to the present invention is assembled in the photographing optical system 41. Also, the digital camera shown in FIG. 23 is constructed so that an imaging optical path is bent along the major side of a finder, and an observer's eye is viewed from the upper side.

The digital camera 40', in this example, includes the photographing optical system 41 having the photographing optical path 42, the finder optical system 43 having the finder optical path 44, the shutter button 45, the flash lamp 46, and the liquid crystal display monitor 47. When the shutter button 45 provided on the upper face of the camera 40 is pushed, photographing is performed, in association with this shutter operation, through the photographing optical system 41, for example, the path-bending zoom optical system of the first embodiment. An object image produced by the photographing optical system 41 is formed on the imaging surface of a CCD 49 through the filters such as the low-pass filter and the infrared cutoff filter.

The object image received by the CCD 49 is displayed as an electronic image on the liquid crystal display monitor 47 provided on the back face of the camera, through the processing means 51. The recording means 52 is connected to this processing means 51 so that a photographed electronic image can also be recorded. Also, the recording means 52 may be provided to be independent of the processing means 51, or may be constructed so that the image is electronically recorded and written by a flexible disk, memory card, or MO.

Further, the finder objective optical system 53 is located on the finder optical path 44. The object image produced by the finder objective optical system 53 is formed on the field frame 57 of the Porro prism 55 that is an image erecting member. Behind the Porro prism 55 is located the eyepiece optical system 59 which introduces an erect image into the observer's eye E. Also, cover members 50 are provided on the entrance side of each of the photographing optical system 41 and the finder objective optical system 53, and on the exit side of the eyepiece optical system 59.

The digital camera 40' constructed as mentioned above brings about an effect on the slim design of the camera by bending the optical path along the major side. Moreover, the photographing optical system 41 is a zoom optical system that has a wide angle of view and a high variable magnification ratio, is favorably corrected for aberration, is bright, and has a long back focal length along which filters can be placed. Thus, the high performance design can be realized, and the compact design and the low-cost design can be attained because the photographing optical system 41 can be constructed with a small number of optical members.

Also, the digital camera 40' of this embodiment may be constructed so that the imaging optical path is bent along the minor side of the finder. In this case, the position of a stroboscopic lamp (or the flash lamp) is further shifted upward from the entrance surface of a photographic lens so that the influence of a shadow produced in stroboscopic photography of a person can be lessened.

Also, although in FIG. 23 a plane-parallel plate is provided as each of the cover members 50, a lens with power may be used.

Here, without providing the cover member, the most object-side surface of the optical system of the present invention can also be used as the cover member. In this example, the most object-side surface corresponds to the entrance surface of the first lens unit G1.

The configuration of the internal circuit of the digital camera 40' is as described with respect to FIG. 20.

Also, in the embodiments to be described below, their essential sections are almost the same as in the above configuration.

Figure 24:
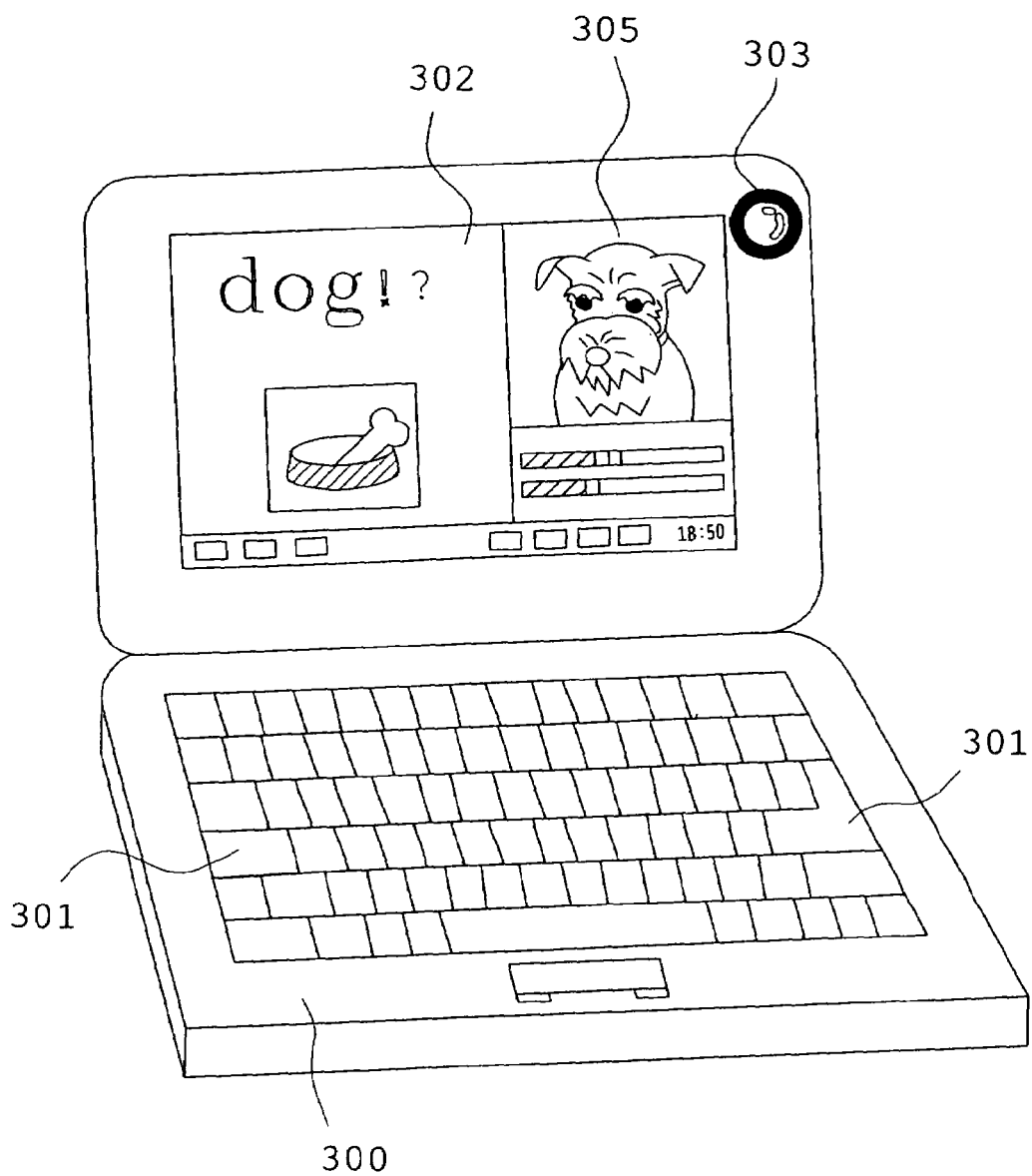
FIG. 24 is a perspective front view showing a personal computer, whose cover is opened, incorporating the optical system of the present invention as an objective optical system.
Figure 25:
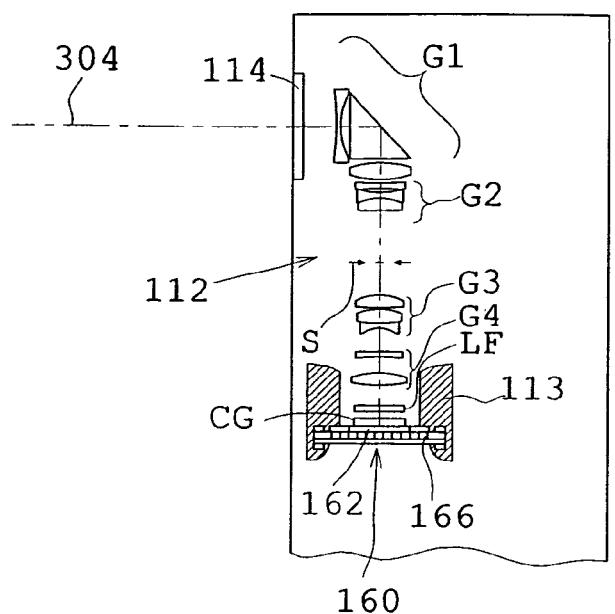
FIG. 25 is a sectional view showing a photographing optical system incorporated in the personal computer of FIG. 24.
Figure 26:
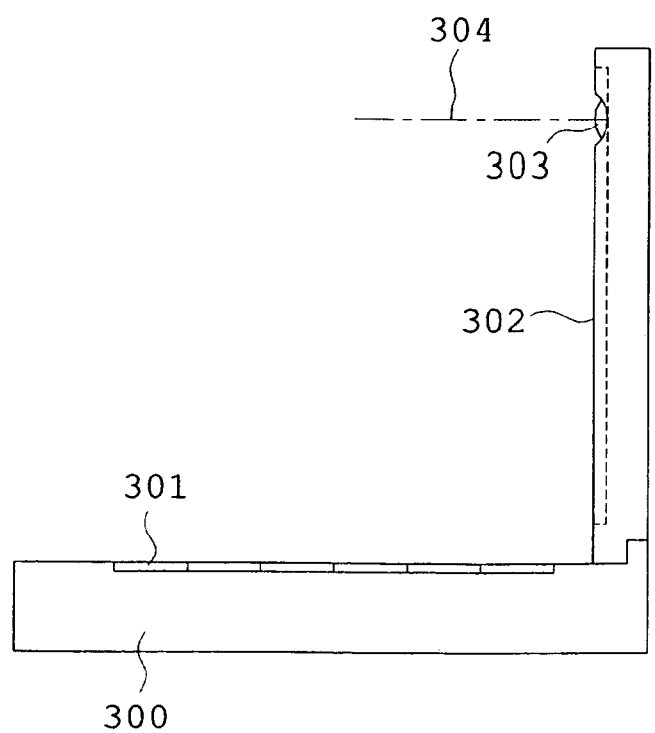
FIG. 26 is a side view showing the personal computer of FIG. 24.

Subsequently, a personal computer that is an example of an information processing apparatus incorporating the path-bending zoom optical system of the present invention as an objective optical system is illustrated in FIGS. 24-26.

A personal computer 300, as shown in FIGS. 24-26, has a keyboard 301 provided for the purpose that an operator inputs information from the exterior; an information processing means or a recording means, not shown; a monitor 302 displaying information for the operator; and a photographing optical system 303 for photographing the operator himself or surrounding images. Here, the monitor 302 may be a transmission-type liquid crystal display element illuminated with backlight, not shown, from the back side; a reflection-type liquid crystal display element reflecting light from the front for display; or a CRT display.

In FIG. 24, the photographing optical system 303 is housed in the monitor 302 upper-right, but it is not limited to this place and may be located at any place, such as the periphery of the monitor 302 or of the keyboard 301. The photographing optical system 303 has an objective lens 112 including the path-bending zoom optical system, for example, of the first embodiment according to the present invention and an imaging element chip 162 receiving an image, located on a photographing optical path 304. These are housed in the personal computer 300.

Here, the cover glass CG is additionally cemented to the imaging element chip 162 and they are integrally constructed as an imaging unit 160. Since the imaging unit 160 is fitted into the rear end of a lens frame 113 of the object lens 112 and can be mounted in a single operation, the alignment of the objective lens 112 and the chip 162 and the adjustment of face-to-face spacing are not required and assembly is simplified. At the top (not shown) of the lens frame 113, a cover glass 114 for protecting the objective lens 112 is placed. Also, the driving mechanism of the zoom optical system in the lens frame 113 is omitted from the figure.

An object image received by the imaging element chip 162 is input into the processing means of the personal computer 300 through a terminal 166 and is displayed as an electronic image on the monitor 302. In FIG. 24, an image 305 photographed by the operator is shown as an example. It is also possible to display the image 305 on the personal computer of a communication mate lying at a remote place through the processing means and the internet or the telephone.

FIGS. 27A-27C show a telephone that is an example of the information processing apparatus housing the path-bending zoom optical system of the present invention as the photographing optical system, notably a mobile phone that is handy to carry.

A mobile phone 400, as shown in FIGS. 27A-27C, includes a microphone section 401 inputting an operator's voice as information; a speaker section 402 outputting the voice of a communication mate; input dials 403 that an operator inputs information; a monitor 404 displaying information, such as the photographed image of the operator himself or of the communication mate and telephone numbers; a photographing optical system 405; an antenna 406 transmitting and receiving communication waves; and a processing means (not shown) processing image information, communication information, and input signals. Here, the monitor 404 is a liquid crystal display element.

Also, in the figures, the positions of individual components are not limited to those shown. The photographing optical system 405 has the objective lens 112 including the path-bending zoom optical system, for example, of the first embodiment according to the present invention and the imaging element chip 162 receiving an object image, located on a photographing optical path 407. These are housed in the mobile phone 400.

Here, the cover glass CG is additionally cemented to the imaging element chip 162 and they are integrally constructed as the imaging unit 160. Since the imaging unit 160 is fitted into the rear end of the lens frame 113 of the objective lens 112 and can be mounted in a single operation, the alignment of the objective lens 112 and the chip 162 and the adjustment of face-to-face spacing are not required and assembly is simplified. At the top (not shown) of the lens frame 113, the cover glass 114 for protecting the objective lens 112 is placed. Also, the driving mechanism of the zoom optical system in the lens frame 113 is omitted from the figure.

An object image received by the imaging element chip 162 is input into the processing means, not shown, through the terminal 166 and is displayed as an electronic image on either the monitor 404 or the monitor of the communication mate, or both. Also, the processing means includes a signal processing function that when the image is transmitted to the communication mate, the information of the object image received by the chip 162 is converted into a transmittable signal.

What is claimed is:

1. An electronic imaging apparatus comprising:
   a zoom optical system including, in order from an object side,
   a first lens unit with positive power, constructed of a single component with positive power,
   a second lens unit with negative power, having a single negative lens element located at a most object-side position, both surfaces of which are concave, and a positive lens component located at a most image-side position,
   an aperture stop, and
   a plurality of lens units arranged after the aperture stop, wherein the plurality of lens units arranged after the aperture stop comprise, in order from the object side, a third lens unit with positive power and a fourth lens unit with positive power, and in zooming from the wide-angle position to a telephoto position, at least, a spacing between the first lens unit and the second lens unit is widened, a spacing between the second lens unit and the third lens unit is narrowed, and a spacing between the third lens unit and the fourth lens unit is widened;
   an electronic image sensor located on an image side of the zoom optical system; and
   an image processing section electrically processing image data obtained by the electronic image sensor to change a form thereof,
   wherein the zoom optical system satisfies the following conditions in a situation where a nearly infinite object point is in focus:

$$0.85 < |y_{07}/(f_w \cdot \tan \omega_{07w})| < 0.95$$

$$0.7 < |y_{10}/(f_w \cdot \tan \omega_{10w})| < 0.90$$

where $y_{10}$ is a maximum image height; $y_{07}$ is an image height expressed by multiplying the maximum image height by 0.7; fw is a focal length of the zoom optical system in its entirety at a wide-angle position; $\omega_{07w}$ is an angle of a ray of light incident on a first lens surface of the zoom optical system, corresponding to an image point at the image height $y_{07}$ at the wide-angle position, to an optical axis; and $\omega_{10w}$ is an angle of a ray of light incident on the first lens surface of the zoom optical system, corresponding to an image point at the image height $y_{10}$ at the wide-angle position, to the optical axis.

2. An electronic imaging apparatus comprising:
   a zoom optical system including, in order from an object side,
     a first lens unit with positive power, constructed of a single component with positive power,
     a second lens unit with negative power, having a single negative lens element located at a most object-side position, both surfaces of which are concave, and a positive lens component located at a most image-side position,
     an aperture stop, and
     a plurality of lens units arranged after the aperture stop, wherein the plurality of lens units arranged after the aperture stop comprise, in order from the object side, a third lens unit with positive power and a fourth lens unit with positive power, and in zooming from the wide-angle position to a telephoto position, at least, a spacing between the first lens unit and the second lens unit is widened, a spacing between the second lens unit and the third lens unit is narrowed, and a spacing between the third lens unit and the fourth lens unit is widened;
   an electronic image sensor located on an image side of the zoom optical system; and
   an image processing section electrically processing image data obtained by the electronic image sensor to change a form thereof,
   wherein the zoom optical system satisfies the following condition in a situation where a nearly infinite object point is in focus:

$$0.05 < |y_{07}/(fw \cdot \tan \omega_{07w}) - y_{10}/(fw \cdot \tan \omega_{10w})| < 0.5$$

where $y_{10}$ is a maximum image height; $y_{07}$ is an image height expressed by multiplying the maximum image height by 0.7; fw is a focal length of the zoom optical system in its entirety at a wide-angle position; $\omega_{07w}$ is an angle of a ray of light incident on a first lens surface of the zoom optical system, corresponding to an image point at the image height $y_{07}$ at the wide-angle position, to an optical axis; and $\omega_{10w}$ is an angle of a ray of light incident on the first lens surface of the zoom optical system, corresponding to an image point at the image height $y_{10}$ at the wide-angle position, to the optical axis.

3. An electronic imaging apparatus according to claim 1, wherein the zoom optical system satisfies the following condition in a situation where a nearly infinite object point is in focus:

$$0.5 < (R21+R22)/(R21-R22) < 0.95$$

where R21 is a radius of curvature of an object-side surface of the single negative lens element in the second lens unit and R22 is a radius of curvature of an image-side surface of the single negative lens element in the second lens unit.

4. An electronic imaging apparatus according to claim 1, wherein the zoom optical system satisfies the following condition in a situation where a nearly infinite object point is in focus:

$$n_{dA2} > 1.70$$

where $n_{dA2}$ is a refractive index, for d-line rays, of the single negative lens element in the second lens unit.

5. An electronic imaging apparatus according to claim 1, wherein the zoom optical system satisfies the following condition:

$$ft/fw > 4$$

where ft is a focal length of the zoom optical system in its entirety at a telephoto position.

6. An electronic imaging apparatus comprising:
   a zoom optical system including, in order from an object side,
     a first lens unit with positive power, constructed of a single component with positive power,
     a second lens unit with negative power, having a single negative lens element located at a most object-side position, both surfaces of which are concave, and a positive lens component located at a most image-side position,
     an aperture stop, and
     a plurality of lens units arranged after the aperture stop, wherein the plurality of lens units arranged after the aperture stop comprise, in order from the object side, a third lens unit with positive power and a fourth lens unit with positive power, and in zooming from the wide-angle position to a telephoto position, at least, a spacing between the first lens unit and the second lens unit is widened, a spacing between the second lens unit and the third lens unit is narrowed, and a spacing between the third lens unit and the fourth lens unit is widened;
   an electronic image sensor located on an image side of the zoom optical system; and
   an image processing section electrically processing image data obtained by the electronic image sensor to change a form thereof,
   wherein the zoom optical system satisfies the following condition:

$$-0.90 < (R23+R24)/(R23-R24) < -0.20$$

where R23 is a radius of curvature of a most object-side surface of the positive lens component in the second lens unit and R24 is a radius of curvature of a most image-side surface of the positive lens component in the second lens unit.

7. An electronic imaging apparatus comprising:
   a zoom optical system including, in order from an object side,
     a first lens unit with positive power, constructed of a single component with positive power,
     a second lens unit with negative power, having a single negative lens element located at a most object-side position, both surfaces of which are concave, and a positive lens component located at a most image-side position,
     an aperture stop, and
     a plurality of lens units arranged after the aperture stop, wherein the plurality of lens units arranged after the aperture stop comprise, in order from the object side, a third lens unit with positive power and a fourth lens unit with positive power, and in zooming from the wide-angle position to a telephoto position, at least, a spacing between the first lens unit and the second lens unit is widened, a spacing between the second lens unit and the third lens unit is narrowed, and a spacing between the third lens unit and the fourth lens unit is widened;

an electronic image sensor located on an image side of the zoom optical system; and an image processing section electrically processing image data obtained by the electronic image sensor to change a form thereof, wherein the zoom optical system satisfies the following condition:

$$0.6 < (\beta 2t/\beta 2w)/(\beta 3t/\beta 3w) < 1.2$$

where $\beta 2t$ is a magnification of the second lens unit at a telephoto position, $\beta 2w$ is a magnification of the second lens unit at a wide-angle position, $\beta 3t$ is a magnification of the third lens unit at the telephoto position, and $\beta 3w$ is a magnification of the third lens unit at the wide-angle position.

8. An electronic imaging apparatus according to claim 1, wherein the second lens unit includes, in order from the object side, the single negative lens element whose both surfaces are concave, a single negative lens element, and the positive lens component.

9. An electronic imaging apparatus comprising:

a zoom optical system including, in order from an object side,
- a first lens unit with positive power, constructed of a single component with positive power,
- a second lens unit with negative power, having a single negative lens element located at a most object-side position, both surfaces of which are concave, and a positive lens component located at a most image-side position,
- an aperture stop, and
- a plurality of lens units arranged after the aperture stop, wherein the plurality of lens units arranged after the aperture stop comprise, in order from the object side, a third lens unit with positive power and a fourth lens unit with positive power, and in zooming from the wide-angle position to a telephoto position, at least, a spacing between the first lens unit and the second lens unit is widened, a spacing between the second lens unit and the third lens unit is narrowed, and a spacing between the third lens unit and the fourth lens unit is widened;

an electronic image sensor located on an image side of the zoom optical system; and an image processing section electrically processing image data obtained by the electronic image sensor to change a form thereof, wherein the zoom optical system satisfies the following condition:

$$0.2 < (LT-LW)/(DT-DW) < 1.1$$

where LT is a total length of the zoom optical system at a telephoto position, LW is a total length of the zoom optical system at a wide-angle position, DT is a spacing between the first lens unit and the second lens unit at the telephoto position, and DW is a spacing between the first lens unit and the second lens unit at the wide-angle position.

10. An electronic imaging apparatus according to claim 1, wherein the second lens unit and the third lens unit have a positive lens component and a negative lens component, respectively.

11. An electronic imaging apparatus according to claim 1, wherein, in zooming from the wide-angle position to the telephoto position, a spacing between the fourth lens unit and the electronic image sensor is changed and the aperture stop is moved integrally with the third lens unit.

12. An electronic imaging apparatus according to claim 1, wherein the fourth lens unit is a single positive lens element.

* * * * *